United States Patent
Feng et al.

(10) Patent No.: US 11,445,531 B2
(45) Date of Patent: Sep. 13, 2022

(54) COMMUNICATION METHOD, COMMUNICATIONS APPARATUS, AND READABLE STORAGE MEDIUM

(71) Applicant: HUAWEI TECHNOLOGIES CO., LTD., Guangdong (CN)

(72) Inventors: Shulan Feng, Beijing (CN); Yi Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 30 days.

(21) Appl. No.: 17/039,668

(22) Filed: Sep. 30, 2020

(65) Prior Publication Data

US 2021/0022159 A1 Jan. 21, 2021

Related U.S. Application Data

(63) Continuation of application No. PCT/CN2019/082927, filed on Apr. 16, 2019.

(30) Foreign Application Priority Data

Apr. 16, 2018 (CN) .......................... 201810340234.9

(51) Int. Cl.
*H04W 72/12* (2009.01)
*H04L 5/00* (2006.01)
*H04W 72/04* (2009.01)

(52) U.S. Cl.
CPC ....... *H04W 72/1268* (2013.01); *H04L 5/0048* (2013.01); *H04W 72/0413* (2013.01); *H04W 72/1257* (2013.01)

(58) Field of Classification Search
None
See application file for complete search history.

(56) References Cited

U.S. PATENT DOCUMENTS

2018/0077721 A1* 3/2018 Nory ................. H04L 5/0082
2019/0320454 A1* 10/2019 Li ..................... H04L 1/1812
(Continued)

FOREIGN PATENT DOCUMENTS

CN 106797642 A 5/2017
CN 107231217 A 10/2017
(Continued)

OTHER PUBLICATIONS

Huawei et al.,"Remaining issues on scheduling and HARQ", 3GPP TSG RAN WG1 Meeting #92bis,RI-1804431, Sanya, China Apr. 16-Apr. 20, 2018, total 16 pages.
(Continued)

*Primary Examiner* — Hassan A Phillips
*Assistant Examiner* — Gautam Sharma
(74) *Attorney, Agent, or Firm* — Womble Bond Dickinson (US) LLP

(57) ABSTRACT

This application provides a communication method, a communications apparatus, and a readable storage medium. The communication method includes: determining a second moment based on a first moment and a first processing delay, where the first moment is an estimated earliest moment at which a terminal device can send feedback information for first downlink data, the first processing delay is an estimated delay in processing second downlink data by the terminal device, a time unit used by the second downlink data is after a time unit used by the first downlink data, and the second moment is after the first moment; and sending indication information to the terminal device, where the indication information is used to indicate the terminal device to send feedback information for the second downlink data at the second moment or after the second moment. This application can avoid increasing processing resources, to save resources.

20 Claims, 9 Drawing Sheets

(56) References Cited

U.S. PATENT DOCUMENTS

| | | | | |
|---|---|---|---|---|
| 2020/0259576 A1* | 8/2020 | Saito | ......................... | H04J 1/02 |
| 2020/0314835 A1* | 10/2020 | Baldemair | ............ | H04L 1/1854 |
| 2020/0337072 A1* | 10/2020 | Lunttila | ................ | H04L 5/0055 |
| 2021/0006377 A1* | 1/2021 | Hooli | .................... | H04L 5/0055 |
| 2021/0022159 A1* | 1/2021 | Feng | ................. | H04W 72/1268 |

FOREIGN PATENT DOCUMENTS

| | | |
|---|---|---|
| CN | 107231218 A | 10/2017 |
| CN | 107733578 A | 2/2018 |
| WO | 2016013744 A1 | 1/2016 |
| WO | 2018028135 A1 | 2/2018 |

OTHER PUBLICATIONS

Huawei et al,"Remaining issues on scheduling and HARQ", 3GPP TSG RAN WGI Meeting #93, R1-1805888, Busan, Korea, May 21-25, 2018, total 12 pages.

Huawei et al., "Remaining issues on HARQ management", 3GPP TSG RAN WG1 Meeting #92,3GPP TSG RAN WG1 Meeting #92, R1-1802697, Athens, Greece, Feb. 26-Mar. 2, 2018, total 15 pages.

Qualcomm Incorporated, "Summary of DL/UL scheduling and HARQ management", 3GPP TSG-RAN WG1 Meeting AH 1801, R1-1803440, Feb. 26-Mar. 2, 2018, Athens, Greece, total 23 pages.

Intel Corporation, "Remaining details on UE processing times and HARQ operation", 3GPP TSG RAN WG1 Meeting #92, R1-803265, Athens, Greece, Feb. 26-Mar. 2, 2018, total 12 pages.

Huawei, HiSilicon:"Handling collisions between n+4 and n+3", 3GPP TSG RAN WG1 Meeting #88, R1-1701745, Athens, Greece, Feb. 13-17, 2017, total 4 pages.

CATT:"Discussion on DL/UL scheduling and HARQ management", 3GPP TSG RAN WG1 Meeting AH_#NR3, R1-1716658, Nagoya, Japan, 18th-21st, Sep. 2017, total 6 pages.

Qualcomm Incorporated:"Remaining Issues on DL/UL Scheduling, Processing Time and HARQ management", 3GPP TSG-RAN WG1 Meeting #92bis, R1-1804807, Apr. 16 -20, 2018, Sanya, China. Total 12 pages.

* cited by examiner

COMMUNICATION METHOD, COMMUNICATIONS APPARATUS, AND READABLE STORAGE MEDIUM

CROSS-REFERENCE TO RELATED APPLICATIONS

This application is a continuation of International Application No. PCT/CN2019/082927, filed on Apr. 16, 2019, which claims priority to Chinese Patent Application No. 201810340234.9, filed on Apr. 16, 2018. The disclosures of the aforementioned applications are hereby incorporated by reference in their entireties.

TECHNICAL FIELD

This application relates to the communications field, and more specifically, to a communication method, a communications apparatus, and a readable storage medium.

BACKGROUND

In an existing fifth generation communications system or new radio (NR) system, a physical downlink shared channel (PDSCH) is used to carry data information sent by a network device to a terminal device, a physical downlink control channel (PDCCH) is used to carry control signaling sent by the network device to the terminal device, and a physical uplink control channel (PUCCH) or a physical uplink shared channel (PUSCH) is used to carry a feedback signal indicating whether the data carried on the PDSCH is successfully received, for example, an acknowledgement (ACK) or a negative acknowledgement (NACK).

In addition, the network device determines a transmission mode of downlink data and a resource used to carry a feedback signal for the downlink data, and transmits the transmission mode and the resource to the terminal device through downlink control signaling. The transmission mode of the downlink data includes a time-frequency resource, a modulation scheme, a coding scheme, a resource mapping manner, and the like of the downlink data. The resource used to carry the feedback signal for the downlink data includes a time-frequency resource that carries the feedback signal ACK/NACK.

In the prior art, the network device independently obtains a processing delay based on a configuration condition of each PDSCH, and performs scheduling, so that transmission duration of an ACK/NACK corresponding to the PDSCH is greater than or equal to a processing delay corresponding to a scheduling configuration of the PDSCH. In other words, an earliest time point at which the terminal device starts to send the ACK/NACK is N1 symbols later than a time point at which the terminal device finishes receiving the PDSCH, where N1 is a processing delay obtained based on the configuration of the PDSCH.

However, because different configuration conditions correspond to different processing delays, if two consecutive PDSCHs have different configuration conditions, processing delays are different. Consequently, current data may need to be processed before processing of previous scheduling is completed. This increases processing resources of the terminal device, and further increases implementation costs of the terminal device. If the processing resources of the terminal device are not increased, the terminal device cannot successfully receive currently scheduled data or previously scheduled data, resulting in a receiving failure.

SUMMARY

This application provides a communication method, a communications apparatus, and a readable storage medium, to avoid increasing processing resources of a terminal device, and save resources.

According to a first aspect, a communication method is provided. The communication method includes: determining a second moment based on a first moment and a first processing delay, where the first moment is an estimated earliest moment at which a terminal device can send feedback information for first downlink data, the first processing delay is an estimated delay in processing second downlink data by the terminal device, a time unit used by the second downlink data is after a time unit used by the first downlink data, and the second moment is after the first moment; and sending indication information to the terminal device, where the indication information is used to indicate the terminal device to send feedback information for the second downlink data at the second moment or after the second moment.

In this embodiment of this application, under different scheduling conditions, the terminal device may spend different periods of time in processing downlink data, and the terminal device may need to simultaneously process a plurality of pieces of downlink data. Further, processing resources of the terminal device need to be increased, and resources are wasted. In this embodiment of this application, that a network device schedules a moment at which the terminal device sends feedback information for each of two pieces of downlink data that use different time units includes: determining, based on an earliest feedback moment for previous downlink data (namely, an example of a moment at which the feedback information for the first downlink data is sent), an earliest feedback moment for current downlink data (namely, an example of a moment at which the feedback information for the second downlink data is sent). Considering the earliest feedback moment for the previous downlink data can avoid a case in which the current downlink data needs to be processed before processing of previous scheduling is completed, and further avoid increasing processing resources and implementation costs of the terminal device and wasting resources.

In one embodiment, an interval between the first moment and the second moment is greater than or equal to the first processing delay.

According to this embodiment of this application, the earliest feedback moment for the current downlink data is after the earliest feedback moment for the previous downlink data, and a delay in processing the current downlink data by the terminal device is added. This can further avoid a case in which the terminal device simultaneously processes two pieces of downlink data.

In one embodiment, the first processing delay is determined based on the following parameters: a moment corresponding to a last symbol in the time unit used by the second downlink data, a moment corresponding to a last symbol in a symbol that is in the time unit used by the second downlink data and that is used to carry a demodulation reference signal DMRS, a duration required by the terminal device to process the second downlink data, a length of the time unit used by the second downlink data, or a length of a slot corresponding to the second downlink data.

The terminal device starts to process the downlink data after receiving the demodulation reference signal DMRS. Actual duration of processing the second downlink data by the terminal device is determined by comprehensively considering the length of the time unit used by the second downlink data, an end moment of the DMRS, and the duration required by the terminal device to process the second downlink data. This can effectively avoid a resource conflict caused by an excessively short feedback time.

In one embodiment, the first processing delay is T. T is obtained according to at least any one of the following formulas: T=T1−T2+T3, T=T4, or T=T5, where T1 is the moment corresponding to the last symbol in the time unit used by the second downlink data, T2 is the moment corresponding to the last symbol in the symbol that is in the time unit used by the second downlink data and that is used to carry the demodulation reference signal DMRS, T3 is the duration required by the terminal device to process the second downlink data, T4 is the length of the time unit used by the second downlink data, and T5 is the length of the slot corresponding to the second downlink data.

In one embodiment, before the determining a second moment based on a first moment and a first processing delay, the communication method includes: receiving capability information sent by the terminal device, and determining the first moment based on the capability information.

The capability information reported by the terminal device is received to determine a delay in processing the first downlink data by the terminal device, the duration required by the terminal device to process the second downlink data, and the like.

In one embodiment, the communication method further includes: receiving capability information sent by the terminal device, and determining, based on the capability information, the duration required by the terminal device to process the second downlink data.

The capability information reported by the terminal device is received to determine the duration required by the terminal device to process the second downlink data, and further determine the second moment.

According to a second aspect, a communication method is provided. The communication method includes: receiving indication information sent by a network device, where the indication information is used to indicate a terminal device to send feedback information for second downlink data at a second moment or after the second moment, the second moment is determined based on a first moment and a first processing delay, the first moment is an estimated earliest moment at which the terminal device can send feedback information for first downlink data, the first processing delay is an estimated delay in processing the second downlink data by the terminal device, the second moment is after the first moment, and a time unit used by the second downlink data is after a time unit used by the first downlink data; and sending the feedback information for the second downlink data based on the indication information.

In this embodiment of this application, under different scheduling conditions, the terminal device may spend different periods of time in processing downlink data, and the terminal device may need to simultaneously process a plurality of pieces of downlink data. Further, processing resources of the terminal device need to be increased, and resources are wasted. In this embodiment of this application, that the network device schedules a moment at which the terminal device sends feedback information for each of two pieces of downlink data that use different time units includes: determining, based on an earliest feedback moment for previous downlink data (namely, an example of a moment at which the feedback information for the first downlink data is sent), an earliest feedback moment for current downlink data (namely, an example of a moment at which the feedback information for the second downlink data is sent). The terminal device sends the feedback information for the second downlink data after the second moment based on the indication information sent by the network device. This can avoid simultaneously processing two pieces of downlink data, and further avoid increasing processing resources and implementation costs of the terminal device and wasting resources.

In one embodiment, the sending the feedback information for the second downlink data based on the indication information includes: when an interval between the first moment and the second moment is greater than or equal to the first processing delay, sending the feedback information for the second downlink data after the second moment based on the indication information; or when an interval between the first moment and the second moment is less than the first processing delay, determining, by the terminal device, that the feedback information for the first downlink data is not ACK information.

When the terminal device processes the first downlink data, if the terminal device receives scheduling signaling of the second downlink data, the terminal device determines whether a conflict occurs when the terminal device receives the two pieces of downlink data, by determining whether an interval between a moment for sending the feedback information for the first downlink data and a moment for sending the feedback information for the second downlink data is greater than the first processing delay. If a conflict occurs, the terminal device determines that the feedback information for the first downlink data is not ACK information. In addition, the terminal device may further interrupt processing of the first downlink data. If no conflict occurs, for example, the terminal device does not need to interrupt processing of the first downlink data, the terminal device buffers the second downlink data, and after finishing processing the first downlink data, processes the second downlink data.

In one embodiment, an interval between the first moment and the second moment is greater than or equal to the first processing delay.

According to this embodiment of this application, the earliest feedback moment for the current downlink data is after the earliest feedback moment for the previous downlink data, and a delay in processing the current downlink data by the terminal device is added. This can further avoid a case in which the terminal device simultaneously processes two pieces of downlink data.

In one embodiment, the first processing delay is determined based on the following parameters: a moment corresponding to a last symbol in the time unit used by the second downlink data, a moment corresponding to a last symbol in a symbol that is in the time unit used by the second downlink data and that is used to carry a demodulation reference signal DMRS, duration required by the terminal device to process the second downlink data, a length of the time unit used by the second downlink data, or a length of a slot corresponding to the second downlink data.

The terminal device starts to process the downlink data after receiving the demodulation reference signal DMRS. Actual duration of processing the second downlink data by the terminal device is determined by comprehensively considering the length of the time unit used by the second downlink data, an end moment of the DMRS, and the duration required by the terminal device to process the second downlink data. This can effectively avoid a resource conflict caused by an excessively short feedback time.

In one embodiment, the first processing delay is T. T is obtained according to at least any one of the following formulas: T=T1−T2+T3, T=T4, or T=T5, where T1 is the moment corresponding to the last symbol in the time unit used by the second downlink data, T2 is the moment corresponding to the last symbol in the symbol that is in the time unit used by the second downlink data and that is used to carry the demodulation reference signal DMRS, T3 is the duration required by the terminal device to process the second downlink data, T4 is the length of the time unit used by the second downlink data, and T5 is the length of the slot corresponding to the second downlink data.

In one embodiment, before the receiving indication information sent by a network device, the communication method includes: sending capability information to the network device, where the first moment is determined based on the capability information.

A delay in processing the first downlink data by the terminal device, the duration required by the terminal device to process the second downlink data, and the like can be determined based on the capability information of the terminal device reported by the terminal device.

In one embodiment, the communication method further includes: sending capability information to the network device, where the duration required by the terminal device to process the second downlink data is determined based on the capability information.

According to a third aspect, a communications apparatus is provided. The apparatus is a network device or a chip in a network device, and includes a processing unit and a transceiver unit that are configured to perform the method according to any one of the first aspect or the implementations of the first aspect. When the apparatus is a network device, the processing unit may be a processor, the transceiver unit may be a transceiver, and the transceiver includes a radio frequency circuit. In one embodiment, the network device further includes a storage unit, and the storage unit may be a memory. When the apparatus is a chip in a network device, the processing unit may be a processor, and the transceiver unit may be an input/output interface, a pin, a circuit, or the like on the chip. The processing unit may execute a computer-executable instruction stored in a storage unit. In one embodiment, the storage unit may be a storage unit (for example, a register or a cache) in the chip, or may be a storage unit (for example, a read-only memory (ROM)) that is outside the chip and that is inside the network device, another type of static storage device (for example, a random access memory (RAM)) that may store static information and an instruction, or the like. The processor mentioned anywhere above may be a central processing unit (CPU), a microprocessor, or an application-specific integrated circuit (ASIC), or may be one or more integrated circuits configured to control program execution of the signal sending method in any possible implementation of the first aspect.

According to a fourth aspect, a communications apparatus is provided. The apparatus is a terminal device or a chip in a terminal device, and includes a processing unit and a transceiver unit that are configured to perform the method according to any one of the second aspect or the implementations of the second aspect. When the apparatus is a terminal device, the processing unit may be a processor, the transceiver unit may be a transceiver, and the transceiver includes a radio frequency circuit. In one embodiment, the terminal device further includes a storage unit, and the storage unit may be a memory. When the apparatus is a chip in a terminal device, the processing unit may be a processor, and the transceiver unit may be an input/output interface, a pin, a circuit, or the like on the chip. The processing unit may execute a computer-executable instruction stored in a storage unit. In one embodiment, the storage unit may be a storage unit (for example, a register or a cache) in the chip, or may be a storage unit (for example, a read-only memory (ROM)) that is outside the chip and that is inside the terminal device, another type of static storage device (for example, a random access memory (RAM)) that may store static information and an instruction, or the like. The processor mentioned anywhere above may be a central processing unit (CPU), a microprocessor, or an application-specific integrated circuit (ASIC), or may be one or more integrated circuits configured to control program execution of the signal sending method in any possible implementation of the first aspect.

According to a fifth aspect, a network device is provided. The network device includes a processor and a transceiver that are configured to perform the method according to any one of the first aspect or the implementations of the first aspect.

According to a sixth aspect, a terminal device is provided. The terminal device includes a processor and a transceiver that are configured to perform the method according to any one of the second aspect or the implementations of the second aspect.

According to a seventh aspect, a computer-readable storage medium is provided. The computer-readable storage medium is configured to store a computer software instruction, and the computer software instruction includes a program designed for performing the method according to any one of the first aspect or the implementations of the first aspect.

According to an eighth aspect, a computer-readable storage medium is provided. The computer-readable storage medium is configured to store a computer software instruction, and the computer software instruction includes a program designed for performing the method according to any one of the second aspect or the implementations of the second aspect.

According to a ninth aspect, a computer program product is provided. The computer program product includes computer program code, and when the computer program code is run on a computer, the computer is enabled to perform the method according to any one of the first aspect or the implementations of the first aspect.

According to a tenth aspect, a computer program product is provided. The computer program product includes computer program code, and when the computer program code is run on a computer, the computer is enabled to perform the method according to any one of the second aspect or the implementations of the second aspect.

According to an eleventh aspect, a chip is provided, including a processor and a memory. The memory is configured to store a computer program. The processor is configured to invoke the computer program from the memory and run the computer program. The computer program is used to implement the methods in the foregoing aspects.

According to a twelfth aspect, a communications system is provided. The communications system includes the network device according to the third aspect or the fifth aspect and the terminal device according to the fourth aspect or the sixth aspect.

DESCRIPTION OF EMBODIMENTS

The following describes the technical solutions in this application with reference to the accompanying drawings.

The technical solutions in the embodiments of this application may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device on a future 5G network, a terminal device on a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, a NodeB (NodeB, NB) in the wideband code division multiple access (WCDMA) system, an evolved NodeB (Evolutional NodeB, eNB or eNodeB) in the LTE system, or a radio controller in a cloud radio access network (CRAN) scenario. Alternatively, the network device may be a relay node, an access point, a vehicle-mounted device, a wearable device, a network device on the future 5G network, a network device on the future evolved PLMN network, or the like. This is not limited in the embodiments of this application.

Figure 1:
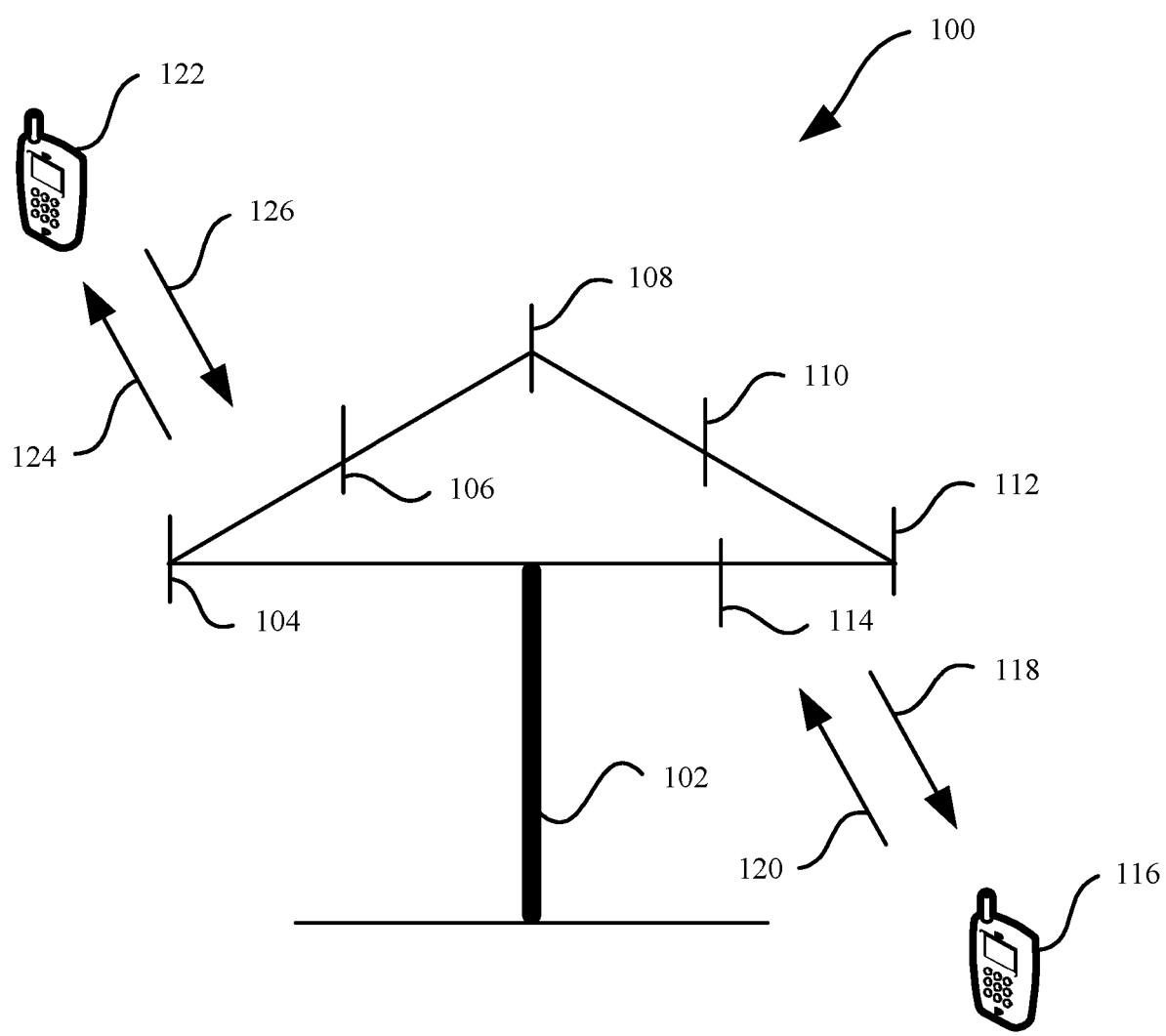
FIG. 1 is a schematic diagram of a system applicable to a communication method according to an embodiment of this application.

FIG. 1 is a schematic diagram of a system 100 to which a communication method according to an embodiment of this application is applicable. As shown in FIG. 1, the system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving.

The network device 102 may communicate with a plurality of terminal devices (for example, terminal devices 116 and 122). However, it may be understood that, the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex (Full Duplex) system, the forward link 118 and the reverse link 120 may use a common frequency band, and the forward link 124 and the reverse link 126 may use a common frequency band.

Each antenna (or an antenna group including a plurality of antennas) and/or each area that are/is designed for communication are/is referred to as a sector of the network device 102. For example, an antenna group may be designed to communicate with a terminal device in the sector within coverage of the network device 102. The network device may send, through a single antenna or a multi-antenna transmit diversity, a signal to all terminal devices in a sector corresponding to the network device. In a process in which the network device 102 communicates with the terminal devices 116 and 122 respectively over the forward links 118 and 124, a transmit antenna of the network device 102 may improve signal-to-noise ratios of the forward links 118 and 124 through beamforming. In addition, in comparison with a manner in which the network device sends, through a single antenna or a multi-antenna transmit diversity, a signal to all terminal devices served by the network device, when the network device 102 sends, through beamforming, a signal to the terminal devices 116 and 122 that are randomly distributed within related coverage, less interference is caused to a mobile device in a neighboring cell.

The communications system 100 may be a PLMN network, a D2D network, an M2M network, an IoT network, or another network. FIG. 1 is merely a simplified schematic diagram used as an example. Another network device may be further included in the network, and is not shown in FIG. 1.

In addition, in a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits to be sent to the wireless communications receiving apparatus over a channel. The data bits may be included in a transport block (or a plurality of transport blocks) of the data, and the transport block may be segmented to generate a plurality of code blocks.

In a wireless communications system, a hybrid automatic repeat request (HARQ) technology is usually used to improve communication reliability. This technology is a combination of forward error correction (FEC) and automatic repeat request (ARQ). A data packet at a media access control (MAC) layer of a transmit end is referred to as a transport block (TB). The transport block at the MAC layer is FEC encoded and modulated at a physical layer, and then is sent to an antenna port for transmission. After arriving at a receive end, the transport block is demodulated and decoded at a physical layer of the receive end, and a decoding result is fed back to the transmit end. If the receive end can correctly receive the data packet, the receive end sends an acknowledgement (ACK) signal to the transmit end. If the receive end cannot correctly receive the data packet, the receive end sends a negative acknowledgement (NACK) signal to the transmit end. If the transmit end receives the NACK fed back by the receive end, the transmit end retransmits the data packet. A type of HARQ technology is an incremental redundancy (IR) technology. In the IP technology, an information bit (bit) and some redundancy bits are sent during first transmission, and additional redundancy bits are sent through retransmission (Retransmission). If decoding fails after the first transmission, a channel coding rate may be reduced by retransmitting more redundancy bits, to increase a decoding success rate. If the decoding still fails after the retransmitted redundancy bits are added, the retransmission is performed again. As a quantity of retransmissions increases, redundancy bits are continuously accumulated, and the channel coding rate is continuously reduced, to achieve a better decoding effect. Usually, an initial transmitted data packet is self-decodable. However, only a few redundancy bits may be included in a retransmitted data packet, and the retransmitted data packet is not self-decodable.

In an existing fifth generation communications system or NR system, a physical downlink shared channel (PDSCH) is used to carry data information sent by a network device to a terminal device, a physical downlink control channel (PDCCH) is used to carry control signaling sent by the network device to the terminal device, and a physical uplink control channel (PUCCH) or a physical uplink shared channel (PUSCH) is used to carry an acknowledgement signal ACK/NACK indicating whether the data carried on the PDSCH is successfully received.

In the embodiments of this application, downlink HARQ is mainly concerned. The following uses a network device and a terminal device as an example to briefly describe a method used for downlink HARQ.

The network device determines a transmission mode of downlink data and a resource used to carry a feedback signal for the downlink data, and transmits the transmission mode and the resource to the terminal device through downlink control signaling. The transmission mode of the downlink data includes a time-frequency resource, a modulation scheme, a coding scheme, a resource mapping manner, and the like of the downlink data. The resource used to carry the feedback signal for the downlink data includes a time-frequency resource for the feedback signal ACK/NACK. The time-frequency resource for the ACK/NACK may be directly specified by the control signaling sent by the network device, or may be obtained according to a specific rule, or some resource information is specified by the control signaling, and some resource information is obtained according to a predefined rule.

The terminal device first receives the downlink control signaling to obtain a transmission mode of a PDSCH that needs to be received by the terminal device, then receives the corresponding PDSCH in the defined transmission mode, and decodes a data block carried on the PDSCH. The data block is also referred to as a transport block (TB). The terminal device generates a corresponding ACK/NACK signal based on a decoding result, and then transmits the corresponding ACK/NACK signal on the transmission resource for the ACK/NACK based on the determined transmission mode of the ACK/NACK.

A downlink data processing delay of the terminal device is a time interval from a moment at which the terminal device finishes receiving a last orthogonal frequency division multiplexing (OFDM) symbol of a PDSCH to an earliest possible moment at which the terminal device starts to send HARQ information corresponding to the PDSCH. The HARQ information includes ACK/NACK information fed back by the terminal device. Usually, a time interval from a moment at which the terminal device finishes receiving a last OFDM symbol of a PDSCH to a moment at which the terminal device starts to send an ACK/NACK signal is greater than or equal to the downlink data processing delay of the terminal device.

The downlink data processing delay is expressed in OFDM symbols, and is denoted as N1 OFDM symbols, where N1 is a positive number. Currently, for different transmission modes of a PDSCH, there are different processing delays. Table 1 shows downlink data processing delays under different scheduling conditions.

TABLE 1

| Scheduling condition | | N1 (unit: symbol (symbol)) | | | |
|---|---|---|---|---|---|
| | | 15 kHz subcarrier | 30 kHz subcarrier | 60 kHz subcarrier | 120 kHz subcarrier |
| Duration of a PDSCH is 7-14 symbols | Front-loaded demodulation reference signal only | 8 | 10 | 17 | 20 |
| | Front-loaded demodulation reference signal and additional demodulation reference signal | 13 | 13 | 20 | 24 |
| Duration of a PDSCH is d, where 2 < d < 7 | Front-loaded demodulation reference signal only | 8 + 7 − d | 10 + 7 − d | 17 + 7 − d | 20 + 7 − d |

The scheduling condition indicates a condition for scheduling the PDSCH by the network device. The scheduling condition of the PDSCH includes duration of the PDSCH, a subcarrier spacing (SCS) of the PDSCH, a configuration of a demodulation reference signal (DMRS) of the PDSCH, and the like.

The duration of the PDSCH may be 7-14 OFDM symbols, or the duration of the PDSCH may be 2-7 OFDM symbols.

The demodulation reference signal (DMRS) is a reference signal that is together with the PDSCH and that is used to demodulate the PDSCH. The terminal device obtains a channel estimation result based on the demodulation reference signal, and sends the channel estimation result to a PDSCH demodulation module for demodulation. The DMRS may have two configuration modes: a front-loaded demodulation reference signal only, namely, "front-loaded DMRS only", and both a front-loaded demodulation reference signal and an additional demodulation reference signal, namely, "front-loaded DMRS+additional DMRS". Usually, the terminal device starts channel estimation calculation only after obtaining all DMRSs of a PDSCH.

The subcarrier spacing (SCS) is a subcarrier spacing of an orthogonal frequency division multiplexing (OFDM) signal during transmission of the PDSCH.

N1: A time interval from a moment at which the terminal device finishes receiving the PDSCH to an earliest possible moment at which the terminal device starts to transmit a corresponding ACK/NACK is defined as a quantity of OFDM symbols required by the terminal device for processing. N1 varies with different scheduling conditions of the PDSCH. For example, N1 is 8 in a configuration in which there is a 15 kHz SCS, the duration of the PDSCH is 14 OFDM symbols, and there is only a front-loaded demodulation reference signal. N1 is 13 in a configuration in which there is a 15 kHz SCS, the duration of the PDSCH is 14 OFDM symbols, and there are both a front-loaded demodulation reference signal and an additional demodulation reference signal.

As described above, the network device determines the time-frequency resource for the feedback signal ACK/NACK, including a transmission time of the ACK/NACK corresponding to the PDSCH scheduled by the network device. In one manner, the network device determines the time-frequency resource based on the scheduling condition (or referred to as a transmission mode, a scheduling configuration, a configuration condition, or the like) of the PDSCH.

Specifically, the transmission time of the ACK/NACK corresponding to the PDSCH scheduled by the network device is greater than or equal to a corresponding processing delay under the scheduling condition of the PDSCH. In other words, an earliest moment at which the terminal device starts to send the ACK/NACK is N1 symbols later than the moment at which the terminal device finishes receiving the PDSCH. An earliest moment at which the network device starts to receive the ACK/NACK for the PDSCH is (N1+TA) symbols later. TA represents a timing advance (timing advanced, TA), and may represent, for example, an uplink timing advance of the terminal device relative to downlink transmission. TA may be measured by symbol, absolute time, or sampling rate. TA is measured by symbol herein.

TABLE 2

| PDSCH D1 | | PDSCH D2 | |
|---|---|---|---|
| Parameter | Meaning | Parameter | Meaning |
| X1_1 | Position of a last symbol that carries a DMRS of the PDSCH D1 | X2_1 | Position of a last symbol that carries a DMRS of the PDSCH D2 |
| X1_2 | Position of a last symbol that carries data of the PDSCH D1 | X2_2 | Position of a last symbol that carries data of the PDSCH D2 |
| X1_3 | Position of a first symbol at which the terminal device can send | X2_3 | Position of a first symbol at which the terminal device can send |

TABLE 2-continued

| | PDSCH D1 | | PDSCH D2 |
|---|---|---|---|
| Parameter | Meaning | Parameter | Meaning |
| | a feedback signal corresponding to the PDSCH D1 | | a feedback signal corresponding to the PDSCH D2 |
| N1_1 | Processing delay of the PDSCH D1 under a scheduling condition | N1_2 | Processing delay of the PDSCH D2 under a scheduling condition |
| S_1 | Subcarrier spacing of the PDSCH D1 | S_2 | Subcarrier spacing of the PDSCH D2 |
| TA_1 | TA used when the feedback signal for the PDSCH D1 is sent | TA_2 | TA used when the feedback signal for the PDSCH D2 is sent |

For example, the network device schedules two PDSCHs: the PDSCH D1 and the PDSCH D2. A length of the PDSCH D1 is 14 OFDM symbols, an SCS is 15 kHz, and a configuration of the DMRS of the PDSCH D1 is a front-loaded demodulation reference signal and an additional demodulation reference signal. A length of the PDSCH D2 is 13 OFDM symbols, an SCS is 15 kHz, and a configuration of the DMRS of the PDSCH D2 is only a front-loaded demodulation reference signal.

For ease of understanding, the symbols mentioned in the embodiments of this application are first described with reference to Table 2 and FIG. 2.

In the embodiments of this application, that a value of TA_1 of the PDSCH D1 is the same as a value of TA_2 of the PDSCH D2 is used as an example for description. However, this is not limited in the embodiments of this application.

In the embodiments of this application, a symbol means an OFDM symbol, and represents an absolute symbol position counted from a moment used as symbol 0. If a first symbol for the data of the PDSCH D1 is symbol 0, as shown in FIG. 2, the length of the PDSCH D1 is 14 OFDM symbols. The last symbol that carries the DMRS of the PDSCH D1 is symbol 11. In other words, X1_1=11. The last symbol for the data of the PDSCH D1 is symbol 13. In other words, X1_2=13. The symbols herein are numbered from 0. In other words, the first symbol of the PDSCH D1 is symbol 0.

In this case, the length of the PDSCH D2 is 13 OFDM symbols. If the first symbol for the data of the PDSCH D1 is symbol 0, the last symbol that carries the DMRS of the PDSCH D2 is symbol 17. In other words, X2_1=17. The last symbol for the data of the PDSCH D2 is symbol 26. In other words, X2_2=26.

Figure 2:
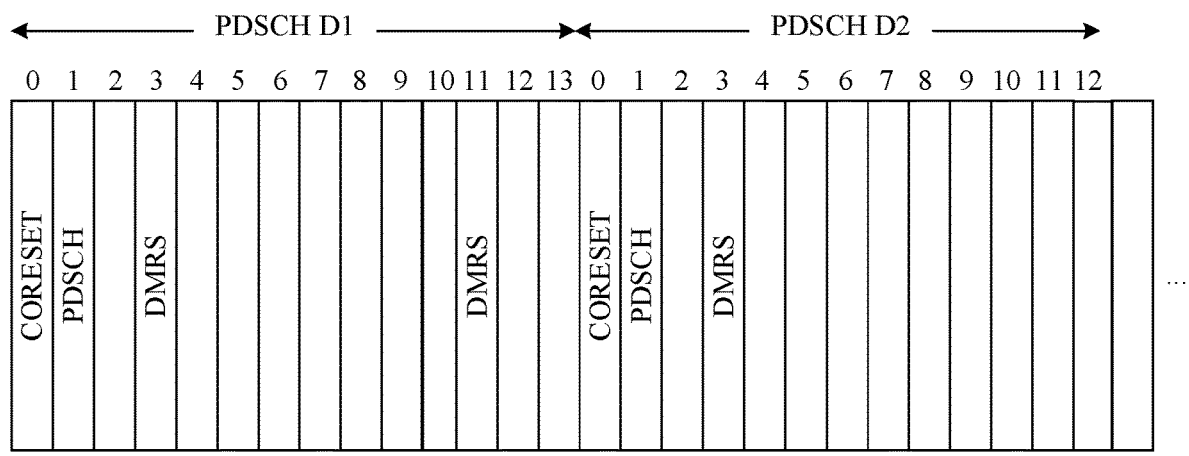
FIG. 2 is a schematic diagram of downlink data processing applicable to a communication method according to an embodiment of this application.

It can be learned from FIG. 2 that the PDSCH D1 and the PDSCH D2 are transmitted in two adjacent slots.

Figure 3:
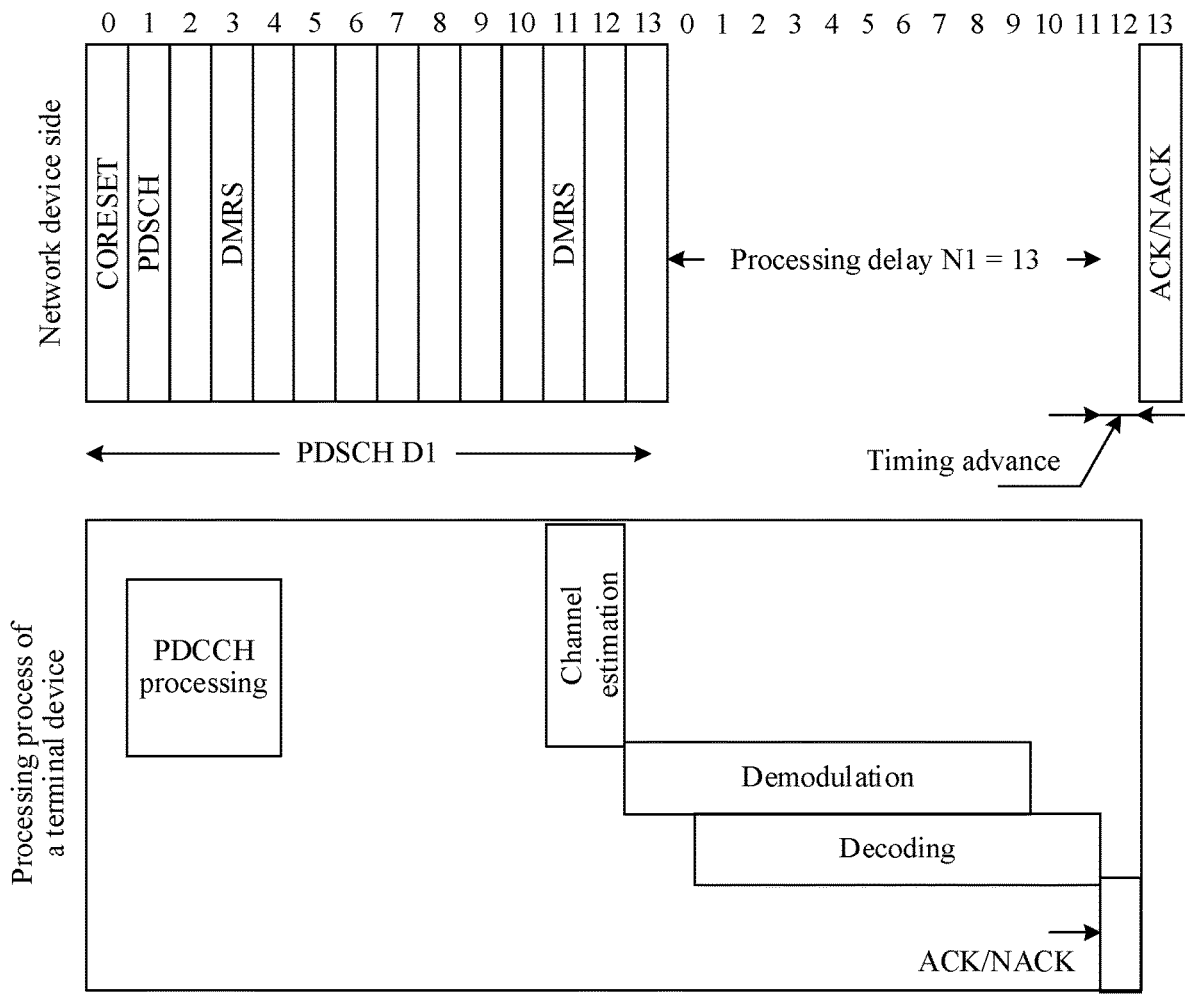
FIG. 3 is a schematic diagram of first downlink data processing applicable to a communication method according to an embodiment of this application.
Figure 4:
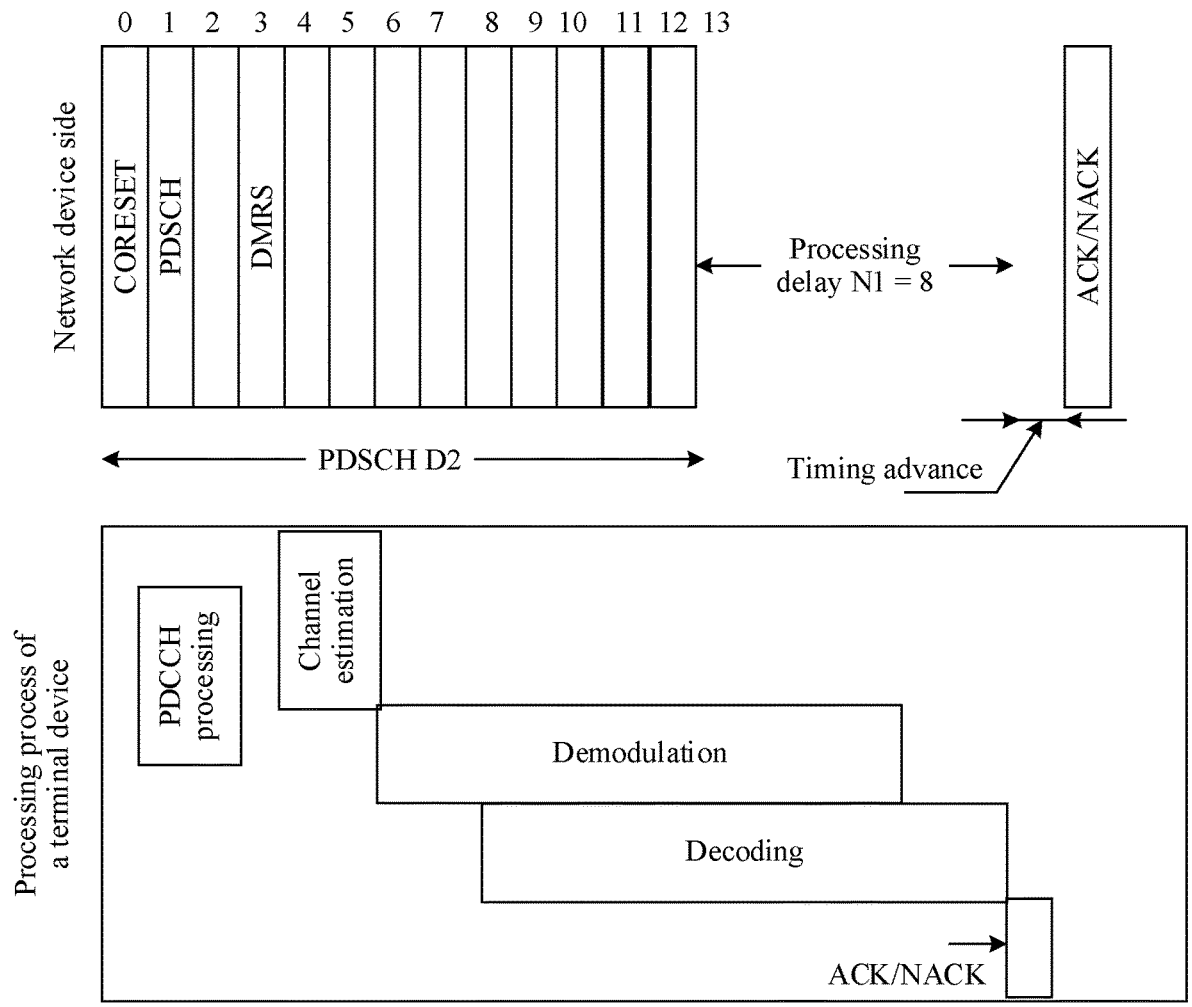
FIG. 4 is a schematic diagram of first downlink data processing applicable to a communication method according to an embodiment of this application.

FIG. 3 and FIG. 4 are respectively schematic diagrams of processing performed when the terminal device schedules the PDSCH D1 and the PDSCH D2. The PDSCH D1 is used as an example. The PDSCH D1 is transmitted in an $N^{th}$ slot, the last symbol for the data of the PDSCH D1 is a symbol X1_2 in the $N^{th}$ slot, and a first symbol for a corresponding ACK/NACK is a symbol X1_3. In this case, from a perspective of the terminal, X1_3 is greater than a value of X1_2+N1_1. K1 is a positive integer. L represents a quantity of symbols in one slot. For example, L=14 or L=7. A first symbol for the ACK/NACK received by the network device is a symbol (X1_3+TA) in an $(N+K1)^{th}$ slot.

Usually, when processing data, the terminal device can start channel estimation, demodulation, decoding, and the like only after receiving all DMRSs of a PDSCH that needs to be received. It can be learned from FIG. 3 and FIG. 4 that in a scenario in which there is only a front-loaded demodulation reference signal, the terminal device can start channel estimation and demodulation earlier. Therefore, if a processing delay of a PDSCH is counted from an end moment of a last symbol of the PDSCH, a processing delay of a PDSCH that includes only a front-loaded demodulation reference signal is shorter than a processing delay of a PDSCH that includes both a front-loaded demodulation reference signal and an additional demodulation reference signal.

Figure 5:
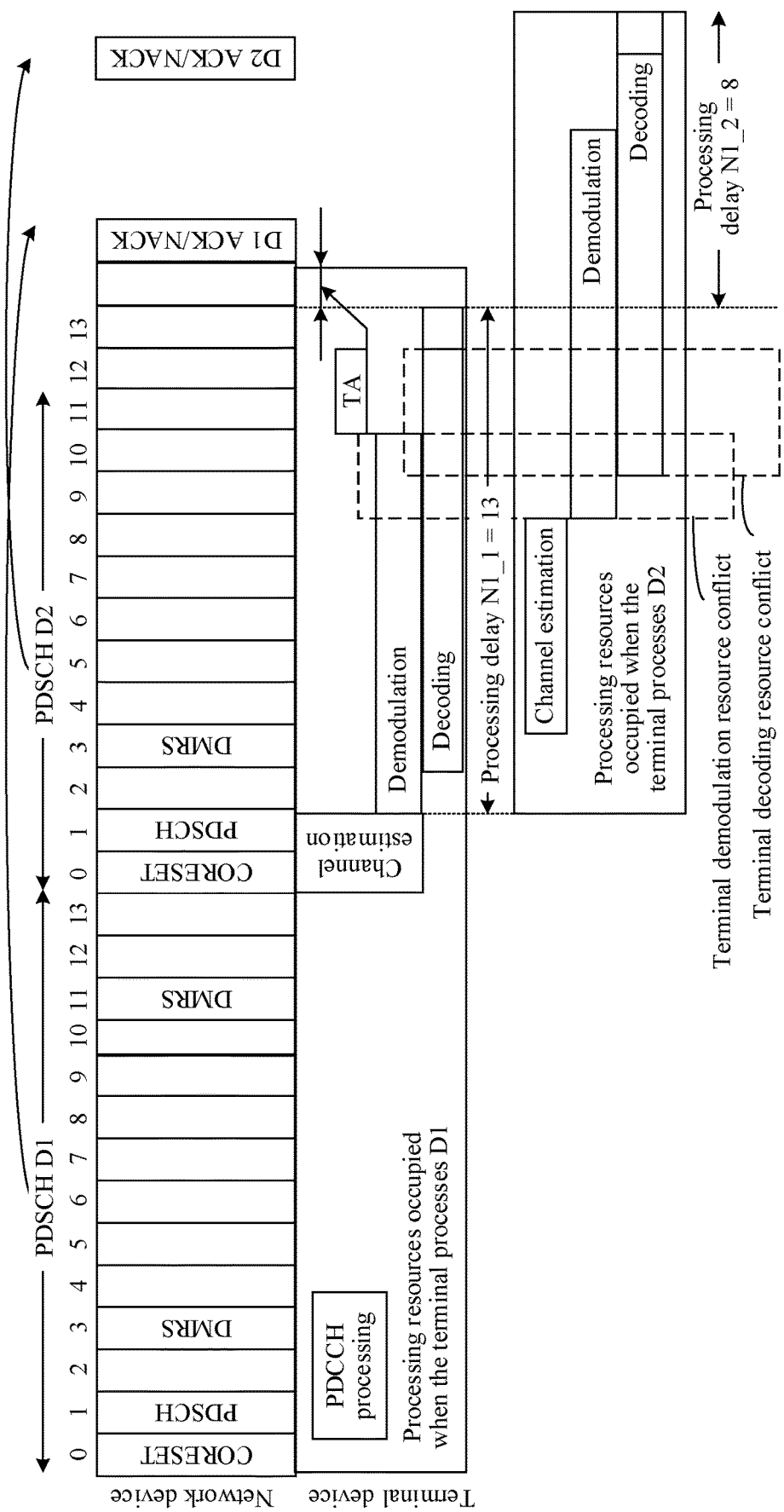
FIG. 5 is a schematic diagram of a case in which a conflict occurs when downlink data is processed applicable to a communication method according to an embodiment of this application.

When the network device performs scheduling in the foregoing manner, the network device obtains a processing delay N1 based on a scheduling condition of each PDSCH, and determines, based on N1, a time point for sending an ACK/NACK. However, because different scheduling conditions correspond to different processing times, when only a scheduling condition of a current PDSCH is considered, but different processing times for two consecutive PDSCHs due to different scheduling conditions are not considered, current data may need to be processed before processing of previous scheduling is completed, causing a processing conflict. FIG. 5 shows a case in which a conflict occurs.

As shown in FIG. 5, the network device continuously schedules the PDSCH D1 (which may also be referred to as D1 for short) and the PDSCH D2 (which may also be referred to as D2 for short). The PDSCH D1 is transmitted in slot N. The network device determines that a start time point for sending an ACK/NACK for the PDSCH D1 is a first symbol in slot (N+K1)=(N+2) after the PDSCH D1, namely, a symbol X1_3=0. It is assumed that the TA uses one symbol. In the foregoing manner, the network device configures, to be greater than or equal to a value of N1+TA, a time for sending feedback information (the ACK/NACK) for the PDSCH D1. In this case, an interval between a configured start time point for transmitting the feedback information, namely, the first symbol in slot (N+K1)=(N+2) after the PDSCH D1, and the last symbol X1_2 for the PDSCH of the PDSCH D1 is 14 symbols. This can meet a condition that is set in the prior art. Similarly, in the foregoing manner, the network device configures, to be greater than or equal to a value of N1+TA, a time for sending feedback information (an ACK/NACK) for the PDSCH D2. If the PDSCH D1 is transmitted in slot (N+1), an interval between a configured start time point for transmitting the feedback information, namely, a ninth symbol in slot (N+1+1) after the PDSCH D2, and the last symbol X2_2 for the PDSCH of the PDSCH D2 is nine symbols. This can meet a condition that is set in the prior art. However, a processing delay of a current PDSCH is determined based on a scheduling configuration of the current PDSCH, and then a feedback time point of an ACK/NACK for the current PDSCH is further determined. In this case, current data needs to be processed before processing of previous scheduling is completed. As shown in FIG. 5, the data of the PDSCH D2 needs to be processed before demodulation of the PDSCH D1 is completed. A method for resolving this problem is to increase processing resources of the terminal device. However, increasing the processing resources of the terminal device greatly increase implementation costs of the terminal device.

Embodiments of this application provide a communication method, to resolve a conflict that occurs in a receiving resource (for example, a resource such as a demodulator or a decoder) of a terminal due to different scheduling configurations of two consecutive PDSCHs.

It should be noted that in the embodiments of this application, "data" or "information" may be understood as a bit generated after an information block is encoded, or "data" or "information" may be understood as a modulation symbol generated after an information block is encoded and modulated. One information block may include at least one TB, or one information block may include at least one TB group (including at least one TB), or one information block may include at least one code block (Code Block, CB), or one information block may include at least one CB group (including at least one CB), or the like.

It should be further noted that, in the embodiments of this application, "data of a PDSCH" is downlink data carried on the PDSCH, and a person skilled in the art understands a meaning of the "data of a PDSCH". In the embodiments of this application, the "data of a PDSCH" and the "PDSCH" may be sometimes interchangeably used. It should be noted that meanings expressed by the "data of a PDSCH" and the "PDSCH" are the same when a difference between the "data of a PDSCH" and the "PDSCH" is not emphasized.

It should be further noted that in this application, "first" and "second" are merely intended to distinguish between different objects, for example, distinguish between downlink data carried in different time domain positions, and do not constitute any limitation on this application.

It should be further noted that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists. The following describes in detail a communication method 200 in the embodiments of this application with reference to FIG. 6.

First, for ease of understanding, terms mentioned in the embodiments of this application are described.

1. Feedback Information for Downlink Data

The feedback information for the downlink data is ACK/NACK information sent by a terminal device #A to a network device #A after the terminal device #A receives the downlink data, to indicate whether the downlink data is correctly received. A specific form of the feedback information is not limited in the embodiments of this application.

For example, the feedback information may be in an ACK/NACK form, or may be in a discontinuous transmission (DTX) form.

2. Feedback Time Point

In the embodiments of this application, for ease of understanding and description, a moment at which feedback information for downlink data is sent is denoted as the feedback time point. For example, a feedback time point for first downlink data is an earliest moment at which feedback information for the first downlink data can be sent. A feedback time point for second downlink data is an earliest moment at which feedback information for the second downlink data can be sent.

3. Time Unit

In the embodiments of this application, data or information may be carried on a time-frequency resource, and the time-frequency resource may include a time domain resource and a frequency domain resource. In time domain, the time-frequency resource may include one or more time domain units (which may alternatively be referred to as time units). In frequency domain, the time-frequency resource may include a frequency domain unit.

One time domain unit (which may alternatively be referred to as a time unit) may be one symbol, one mini-slot (Mini-slot), one slot (slot), or one subframe (subframe). Duration of one subframe in time domain may be 1 millisecond (ms). One slot includes seven or 14 symbols. One mini-slot may include at least one symbol (for example, two symbols, seven symbols, 14 symbols, or any quantity of symbols fewer than or equal to 14 symbols).

In the embodiments of this application, a processing time is calculated and expressed in symbols, and may be converted into an absolute time based on an SCS and a cyclic prefix (CP) length of a current slot. In the embodiments of this application, an example in which the symbol is an OFDM symbol may be used for description. It should be noted that a specific form of the symbol constitutes no limitation on the protection scope of the embodiments of this application.

In the embodiments of this application, the system 100 may include one or more network devices, and actions performed by the network devices in the communication method 200 in the embodiments of this application are similar. For ease of understanding, the following uses an action of the network device #A as an example for description without a loss of generality.

In addition, in the communications system, there may be one terminal device or a plurality of terminal devices that have accessed the network device #A. In addition, actions performed by the plurality of terminal devices in the communication method 200 in the embodiments of this application are similar. For ease of understanding, the following uses a process of controlling the terminal device #A as an example for description without a loss of generality.

Figure 6:
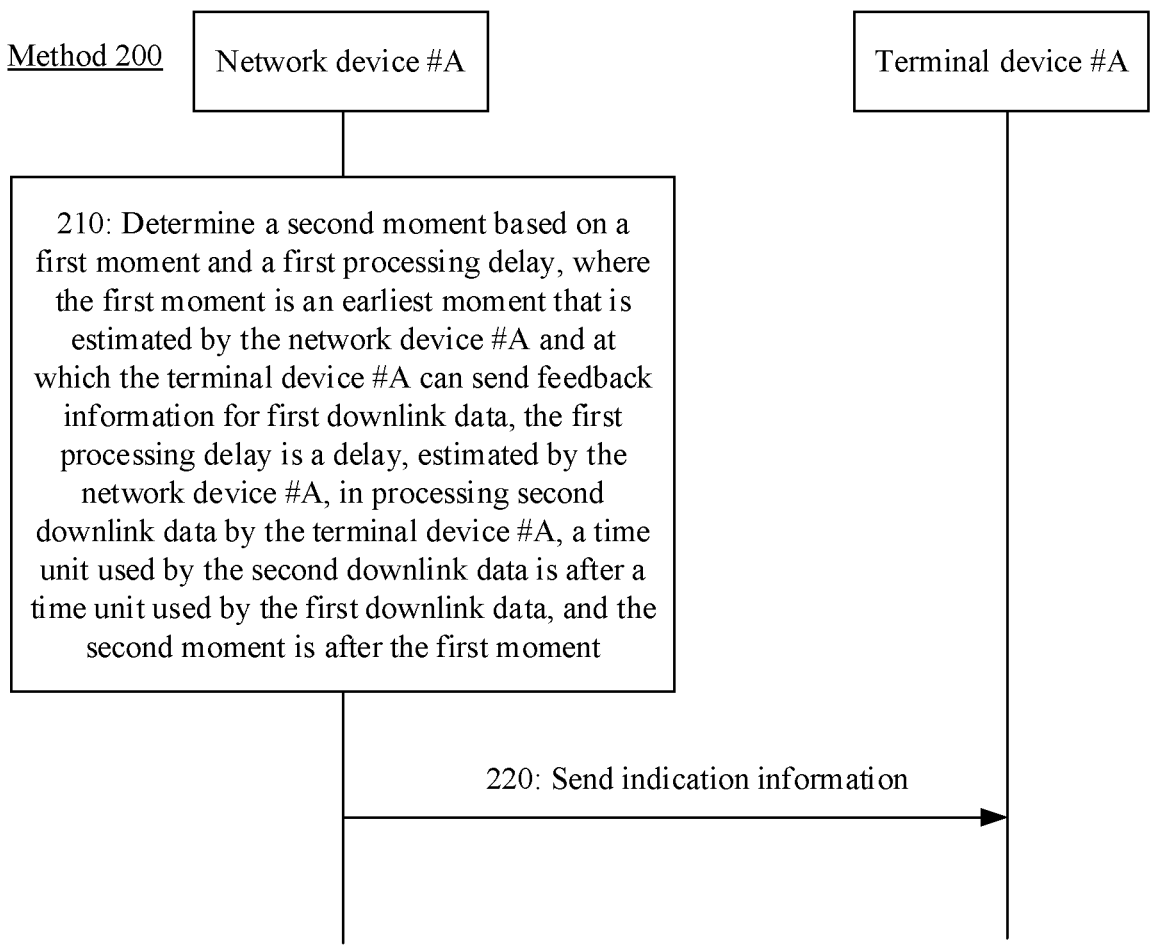
FIG. 6 is a schematic diagram of a communication method according to an embodiment of this application.

FIG. 6 is a schematic interaction diagram of a communication method 200 according to an embodiment of this application. The method 200 includes operations 210 to 220, which are described in detail below.

210: A network device #A determines a second moment based on a first moment and a first processing delay, where the first moment is an earliest moment that is estimated by the network device #A and at which a terminal device #A can send feedback information for first downlink data, the first processing delay is a delay, estimated by the network device #A, in processing second downlink data by the terminal device #A, a time unit used by the second downlink data is after a time unit used by the first downlink data, and the second moment is after the first moment.

In this embodiment of this application, an example in which a PDSCH is used to carry data information sent by the network device to the terminal device is used for description. In other words, an example in which downlink data is carried on the PDSCH is used for description. For ease of understanding, the following uses an example in which the first downlink data is a PDSCH D1 and the second downlink data is a PDSCH D2 for description without a loss of generality.

It should be noted that the PDSCH D1 may mean the first downlink data carried on the PDSCH D1, and the PDSCH D2 may mean the second downlink data carried on the PDSCH D2. A time unit used by the PDSCH D2 is after a time unit used by the PDSCH D1. For example, the time units may be two adjacent slots.

It should be understood that in this embodiment of this application, a time unit used by downlink data indicates a time resource that carries the downlink data.

The PDSCH D1 is a PDSCH (that is, downlink data carried on the PDSCH) scheduled by the network device #A to the terminal device #A and received by the terminal device #A before the PDSCH D2 is scheduled. The network device #A obtains a scheduling condition of the PDSCH D1 to be scheduled to the terminal device #A, where the scheduling condition includes an SCS, scheduling duration of the PDSCH, and a pattern of a DMRS. The network device #A looks up Table 1 based on the SCS, the scheduling duration of the PDSCH, and the pattern of the DMRS, to obtain a processing delay N1_1 of the PDSCH D1. Then the network device #A may determine an earliest moment (namely, an example of the first moment) at which the terminal device #A can send feedback information for the PDSCH D1, that is, determine X1_3. X1_3 is a position of a symbol obtained by adding N1_1 symbols and one symbol to a last symbol of the PDSCH D1. An earliest moment at which the network device #A can receive the feedback information for the PDSCH D1 is X1_3+1+TA.

The network device #A determines the second moment based on the first moment and the first processing delay. In an implementation, the first processing delay is a delay, estimated by the network device #A, in processing the PDSCH D2 by the terminal device #A. In the prior art, a processing delay is counted from a moment at which the terminal device #A finishes receiving a last symbol for data of the PDSCH D2. However, the first processing delay herein is counted from a moment at which the terminal device #A finishes receiving a last symbol for a DMRS of the PDSCH D2.

In one embodiment, the first processing delay is a fixed value, for example, a length of a slot corresponding to the PDSCH D2. For example, the length of the slot used by the PDSCH D2 is 14 OFDM symbols, and the first processing delay is 14 OFDM symbols.

In one embodiment, the first processing delay is a length of the time unit used by the PDSCH D2. For example, the length of the time unit used by the PDSCH D2 is 13 OFDM symbols. In other words, the PDSCH D2 is carried on 13 OFDM symbols. In this case, the first processing delay is 13 OFDM symbols.

The first moment may be an earliest moment that is estimated by the network device #A and at which the feedback information for the PDSCH D1 is sent. The second moment may be an earliest moment that is estimated by the network device #A and at which the feedback information for the PDSCH D2 is sent. For ease of understanding and description, the first moment and the second moment are respectively referred to as a feedback time point for the PDSCH D1 and a feedback time point for the PDSCH D2 in the following.

In this embodiment of this application, the network device #A determines the feedback time point for the PDSCH D2 based on the feedback time point for the PDSCH D1 and the first processing delay, to avoid a resource waste caused when the terminal device #A simultaneously processes two PDSCHs.

In one embodiment, the network device #A determines that a time interval between the feedback time point for the PDSCH D2 and the feedback time point for the PDSCH D1 is greater than or equal to a preset threshold. The preset threshold may be determined based on scheduling conditions of the PDSCH, or may be determined based on an empirical value. This is not limited in this embodiment of this application. If the preset threshold is determined based on the scheduling conditions of the PDSCH, for example, the time interval between the first moment and the second moment may be greater than or equal to the length of the time unit used by the PDSCH D2. If the preset threshold is determined based on the empirical value, for example, the time interval between the first moment and the second moment may be greater than or equal to 14 OFDM symbols. The feedback time point for the PDSCH D2 can be determined based on the preset threshold and the feedback time point for the PDSCH D1.

Specifically, the network device #A obtains scheduling conditions of the PDSCH D2 to be scheduled to the terminal device #A. Similarly, the scheduling condition includes an SCS, scheduling duration of the PDSCH D2, and a configuration of the DMRS. A last symbol X2_1 carrying the DMRS of the PDSCH D2 is determined based on the configuration of the DMRS. A last symbol X2_2 for the data of the PDSCH D2 is determined based on the scheduling duration of the PDSCH D2. The network device #A looks up Table 1 based on the SCS, the scheduling duration of the PDSCH D2, and the pattern of the DMRS, to obtain a processing delay N1_2 of the PDSCH D2. N1_2 may also be understood as duration required by the terminal device #A to process the PDSCH D2.

In one embodiment, the network device #A receives capability information sent by the terminal device #A, and determines, based on the capability information, the duration required by the terminal device #A to process the PDSCH D2, that is, determines N1_2. It should be understood that N1_2 is the duration obtained through table lookup and required by the terminal device #A to process the PDSCH D2. In other words, N1_2 is N1 in Table 1. The first processing delay is duration, estimated by the network device #A, in processing the PDSCH D2 by the terminal device #A starting from the last symbol for the DMRS of the PDSCH D2. In this embodiment of this application, for ease of understanding and differentiation, N1_2' is used to represent the first processing delay.

In one embodiment, the first processing delay is determined based on at least one of the following parameters: a moment corresponding to a last symbol in the time unit used by the PDSCH D2, a moment corresponding to a last symbol in a symbol that is in the time unit used by the PDSCH D2 and that is used to carry the demodulation reference signal DMRS, the duration required by the terminal device #A to process the PDSCH D2, and the length of the time unit used by the PDSCH D2.

It should be understood that the moment mentioned herein may be a symbol position. Specifically, in other words, the network device #A may determine N1_2' based on X2_2 (namely, an example of T1), X2_1 (namely, an example of T2), and N1_2 (namely, an example of T3). X2_2 and X2_1 may be determined based on a scheduling configuration performed by the network device #A on the PDSCH D2. N1_2 may be determined based on the scheduling configuration performed by the network device #A on the PDSCH D2 and by looking up Table 1.

In one embodiment, N1_2'=X2_2−X2_1+N1_2.

Specifically, an actual processing time (namely, an example of the first processing delay) of the PDSCH D2 counting from the last DMRS symbol is calculated by the network device #A as follows: N1_2'=X2_2−X2_1+N1_2.

In one embodiment, in another implementation, N1_2' is a fixed value, for example, the length (namely, an example of T5) of the slot corresponding to the PDSCH D2. For example, the length of the slot corresponding to the PDSCH is 14 OFDM symbols, and the first processing delay is 14 OFDM symbols. Specifically, N1_2'=14.

In one embodiment, in another implementation, N1_2' is the length (namely, an example of T4) of the time unit used by the PDSCH D2. For example, the length of the time unit used by the PDSCH D2 is 13 OFDM symbols. In other words, the PDSCH D2 is carried on 13 OFDM symbols. In this case, the first processing delay is 13 OFDM symbols. Specifically, N1_2'=13.

It should be noted that the foregoing formula is merely an example for description, and this application is not limited thereto. For example, any variant of the foregoing formula falls within the protection scope of this embodiment of this application.

A method for calculating the feedback time point for the PDSCH D1 is as follows: The network device #A obtains the scheduling condition of the PDSCH D1 to be scheduled to the terminal device #A, where the scheduling condition includes the SCS, the scheduling duration of the PDSCH D1, and the configuration of the DMRS. The network device #A looks up Table 1 based on the SCS, the scheduling duration of the PDSCH D1, and the configuration of the DMRS, to obtain the processing time N1_1 of the PDSCH D1. X1_3 is a position of a symbol obtained by adding N1_1 symbols to the last symbol of the PDSCH D1.

The network device #A determines an earliest feedback time point X2_3 for the PDSCH D2 based on an earliest feedback time point X1_3 for the PDSCH D1 scheduled to the terminal device #A and a processing time N1_2' of the current PDSCH D2, where X2_3 is N1_2' symbols later than X1_3. In other words, a difference between X2_3 and X1_3 is greater than or equal to N1_2'.

That the difference between X2_3 and X1_3 is greater than N1_2' may be expressed by using a formula: X2_3>X1_3+N1_2'. That the difference between X2_3 and X1_3 is equal to N1_2' may be expressed by using a formula: X2_3=X1_3+N1_2'.

The network device #A comprehensively considers the processing time of the PDSCH D1 and the processing time of the PDSCH D2 to determine a time point for sending a feedback signal for the current PDSCH D2, so that an earliest feedback time point of an ACK/NACK for the PDSCH D2 is a moment obtained by adding the processing time of the PDSCH D2 to an earliest feedback time point of an ACK/NACK for the PDSCH D1. In other words, the earliest feedback time point of the ACK/NACK for the PDSCH D2 is the end of an actual processing time of the PDSCH D2 after processing of the PDSCH D1 is completed. This avoids a case in which the terminal device simultaneously processes two PDSCHs due to an excessively short feedback time, and further avoids a terminal resource conflict.

In addition, in this embodiment of this application, if TAs of the PDSCH D1 and the PDSCH D2 are different, the network device #A further determines the second moment based on a difference between the TA of the PDSCH D1 and the TA of the PDSCH D2, where X2_3>X1_3+N1_2'+(TA_2−TA_1), or X2_3>X1_3+N1_2'+(TA_2−TA_1).

The network device #A comprehensively considers the processing time of the PDSCH D1, the processing time of the PDSCH D2, and the difference between the TA of the PDSCH D1 and the TA of the PDSCH D2 to determine a time point for sending a feedback signal for the current PDSCH D2, so that an earliest feedback time point of an ACK/NACK for the PDSCH D2 is a moment obtained by adding, to an earliest feedback time point of an ACK/NACK for the PDSCH D1, the processing time of the PDSCH D2 counted from the end of a last DMRS of the PDSCH D2 and a difference obtained by subtracting the TA of the feedback signal for the PDSCH D1 from the TA of the feedback signal for the PDSCH D2. In other words, the earliest feedback time point of the ACK/NACK for the PDSCH D2 is the end of an actual processing time of the PDSCH D2 after processing of the PDSCH D1 is completed. This avoids a case in which the terminal device simultaneously processes two PDSCHs due to an excessively short feedback time, and further avoids a terminal resource conflict.

In one embodiment, the terminal device #A reports capability information of the terminal device #A to the network device #A. The capability information includes a downlink processing delay of the terminal device #A and a quantity of PDSCHs that can be simultaneously processed by the terminal device #A.

The downlink processing delay of the terminal device #A includes processing delays of the terminal device #A under different scheduling conditions. The scheduling conditions herein include at least one or more of the following: a subcarrier spacing of a PDSCH; a configuration of a DMRS of the PDSCH, for example, only a front-loaded demodulation reference signal, or both a front-loaded demodulation reference signal and an additional demodulation reference signal; scheduling duration of the PDSCH; a type of the PDSCH, for example, a type A or a type B, where a time domain length of a PDSCH of the type A is greater than or equal to seven OFDM symbols, and a time domain length of a PDSCH of the type B is less than seven OFDM symbols; and a resource mapping manner of the PDSCH, for example, a manner of mapping first in the time domain and then in the frequency domain, or a manner of mapping first in the frequency domain and then in the time domain.

The quantity of PDSCHs that can be simultaneously processed by the terminal device #A may include one or more of the following:

1. a quantity of unicast or multicast PDSCHs that can be simultaneously processed in each carrier (cell);

2. a quantity of unicast PDSCHs that can be simultaneously processed in each bandwidth (band);

3. a quantity of unicast PDSCHs that can be processed at a high or low frequency;

4. a total quantity of unicast PDSCHs that can be simultaneously processed by the terminal device #A; and 5. a quantity of PDSCHs for each data packet size.

For example, for a data packet greater than 100K, the terminal device #A can simultaneously process one PDSCH; and for a data packet less than or equal to 100 k, the terminal device can simultaneously process two PDSCHs.

In this embodiment of this application, for example, the PDSCH may be a unicast PDSCH, a multicast PDSCH, or a broadcast PDSCH. For example, the quantity of PDSCHs that can be simultaneously processed by the terminal device may be a quantity of unicast PDSCHs that can be simultaneously processed in each carrier, or a quantity of unicast or broadcast PDSCHs that can be simultaneously processed in each carrier. This is not specifically limited in this application.

220: The network device #A sends indication information to the terminal device #A, where the indication information is used to indicate the terminal device #A to send feedback information for the second downlink data at the second moment or after the second moment.

The terminal device #A sends the feedback information for the PDSCH D2 at the second moment or after the second moment based on the indication information.

In one embodiment, when the interval between the first moment and the second moment is greater than or equal to the first processing delay, the terminal device #A sends the feedback information for the PDSCH D2 after the second moment based on the indication information. Alternatively, when the interval between the first moment and the second moment is less than the first processing delay, the terminal device #A determines that the feedback information for the PDSCH D1 is not ACK information.

Normally, scheduling is performed in sequence, and the feedback time point for the PDSCH D2 is not earlier than the feedback time point for the PDSCH D1. If the terminal device #A is receiving data of the PDSCH D1 when the terminal device #A receives scheduling signaling of the PDSCH D2, the terminal device #A determines whether a conflict occurs. A manner of determining whether a conflict occurs is to determine a time interval between a moment of sending the feedback information for the PDSCH D1 and a moment of sending the feedback information for the PDSCH D2. The conflict herein may be understood as whether the terminal device needs to simultaneously process the data of the PDSCH D1 and the data of the PDSCH D2. If the terminal device needs to simultaneously process (for example, simultaneously demodulate) a plurality of pieces of downlink data, it indicates that a conflict occurs.

In this embodiment of this application, the terminal device first determines whether a conflict occurs, or first determines whether current data needs to be processed before processing of previous scheduling is completed, and then processes the plurality of pieces of data. This can avoid increasing processing resources of the terminal device, and further avoid a waste of resources.

An implementation is: determining whether the time interval is greater than or equal to the first processing delay. If the time interval is less than the first processing delay, it indicates that a conflict occurs, and the terminal device #A may interrupt processing of the PDSCH D1. If the time interval is greater than or equal to the first processing delay, it indicates that no conflict occurs, and the terminal device #A buffers the PDSCH D2, and after finishing processing the PDSCH D1, processes the PDSCH D2.

Alternatively, another implementation is: determining whether the time interval is greater than or equal to the preset threshold. If the time interval is less than the preset threshold, it indicates that a conflict occurs, and the terminal device #A may interrupt processing of the PDSCH D1. If the time interval is greater than or equal to the preset threshold, it indicates that no conflict occurs, and the terminal device #A buffers the PDSCH D2, and after finishing processing the PDSCH D1, processes the PDSCH D2. The preset threshold is described in operation 210, and details are not described herein again.

As an example, the network device may determine whether a conflict occurs, based on a symbol difference between the feedback time point for the PDSCH D2 and the feedback time point for the PDSCH D1. Specifically, the terminal device #A determines whether an earliest time point, estimated by the network device #A, for sending the ACK/NACK for the PDSCH D2 is $N1\_2'$ symbols later than the earliest feedback time point for the PDSCH D1, where $N1\_2'=N1\_2+X2\_1-X2\_2$, or $N1\_2'=14$, or $N1\_2'$ is equal to the length of the time unit used by the PDSCH D2.

If the feedback time point, for the PDSCH D2, reserved by the network device #A is $N1\_2'$ symbols later than the earliest time point for sending the ACK/NACK for the PDSCH D1, the terminal device #A continues to process the data of the PDSCH D1, buffers the data of the PDSCH D2, and after finishing processing the data of the PDSCH D1, processes the data of the PDSCH D2.

If the feedback time point for the PDSCH D2 reserved by the network device #A is not $N1\_2'$ symbols later than the earliest time point for sending the ACK/NACK for the PDSCH D1, the terminal device #A interrupts processing of the data of the PDSCH D1, and processes the data of the PDSCH D2. If the processing of the PDSCH D1 is interrupted, the terminal device #A determines that the feedback information for the PDSCH D1 is not ACK information, for example, may feed back NACK or discontinuous transmission (Discontinuous Transmission, DTX) information.

Figure 7:
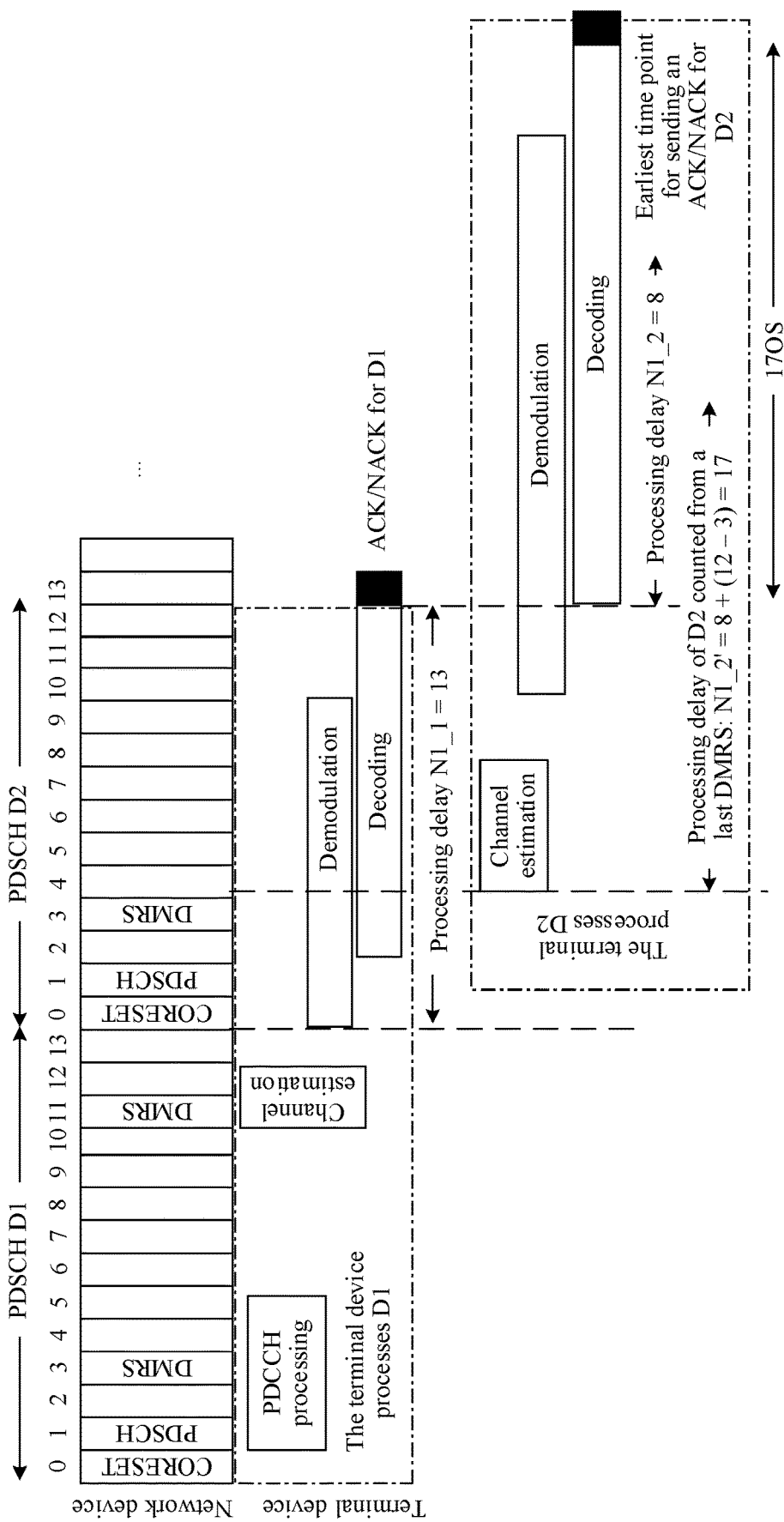
FIG. 7 is a schematic diagram of first downlink data processing and second downlink data processing applicable to a communication method according to an embodiment of this application.

In FIG. 7, a specific example is used to describe the communication method in this embodiment of this application. In FIG. 7, a PDSCH D1 is referred to as D1 for short, and a PDSCH D2 is referred to as D2 for short. An ACK/NACK for D1 indicates an earliest moment at which feedback information for the PDSCH D1 is sent. Similarly, an ACK/NACK for D2 indicates an earliest moment at which feedback information for the PDSCH D2 is sent.

It is assumed that the PDSCH D1 is in slot 0, and a last symbol for data of the PDSCH D1 is symbol 13. In other words, $X1\_2=13$. A last symbol that carries a DMRS of the PDSCH D1 is symbol 11. In other words, $X1\_1=11$. An SCS of the PDSCH D1 is 15 kHz, and duration of the PDSCH D1 is 14 symbols. A processing delay $N1\_1=13$ of the PDSCH D1 is determined by looking up Table 1.

Therefore, the earliest moment at which the feedback information for the PDSCH D1 is sent is $X1\_3=X1\_2+N1\_1=13+13=26$.

It is assumed that the PDSCH D2 is in slot 1, and a last symbol for data of the PDSCH D2 is symbol 12. In other words, $X2\_2=12$. A last symbol that carries a DMRS of the PDSCH D2 is symbol 3. In other words, $X2\_1=3$. According to Table 1, a processing time of the PDSCH D2 is $N1\_2=8$. $N1\_2=8$ is a processing time counted from a last end position for the PDSCH of the PDSCH D2. If the processing time is counted from a position of a last DMRS of the PDSCH D2, the processing time is $N1\_2'=N1\_2+(X2\_2-X2\_1)=8+12-3=17$.

According to the foregoing descriptions of the present invention, a difference between an earliest feedback time point $X2\_3$ for the PDSCH D2 and $X1\_3$ is $N1\_2'$, where $X2\_3>X1\_3+N1\_2'=26+17=43=3\times14+1$. In FIG. 7, 17 OS represents 17 OFDM symbols, and is expressed in symbols.

Therefore, the earliest time point at which the terminal device #A can send the feedback information for the PDSCH D2 is after symbol 1 in slot 2. This avoids a waste of resources caused when two PDSCHs are simultaneously processed.

In addition, the network device #A may further comprehensively consider the processing time of the PDSCH D1, the processing time of the PDSCH D2, and the difference between a TA of the PDSCH D1 and a TA of the PDSCH D2 to determine a time point for sending a feedback signal for the current PDSCH D2, so that an earliest feedback time point of an ACK/NACK for the PDSCH D2 is a moment obtained by adding, to an earliest feedback time point of an ACK/NACK for the PDSCH D1, the processing time of the PDSCH D2 counted from the end of a last DMRS of the PDSCH D2 and a difference obtained by subtracting the TA of the feedback signal for the PDSCH D1 from the TA of the feedback signal for the PDSCH D2. In other words, the earliest feedback time point of the ACK/NACK for the PDSCH D2 is the end of an actual processing time of the PDSCH D2 after processing of the PDSCH D1 is completed. This avoids a case in which the terminal device simultaneously processes two PDSCHs due to an excessively short feedback time, and further avoids a terminal resource conflict.

In this embodiment of this application, under different scheduling conditions, the terminal device may spend different periods of time in processing downlink data, and the terminal device may need to simultaneously process a plurality of pieces of downlink data. Further, processing resources of the terminal device need to be increased, and resources are wasted. In this embodiment of this application, that the network device schedules a moment at which the terminal device sends feedback information for each of two pieces of downlink data that use different time units includes: determining, based on an earliest feedback moment for previous downlink data (namely, an example of a moment at which the feedback information for the first downlink data is sent), an earliest feedback moment for current downlink data (namely, an example of a moment at which the feedback information for the second downlink data is sent). Considering the earliest feedback moment for the previous downlink data can avoid a case in which the current downlink data needs to be processed before processing of previous scheduling is completed, and further avoid increasing processing resources and implementation costs of the terminal device and wasting resources.

The foregoing describes the method embodiments of this application in detail with reference to FIG. 1 to FIG. 7. The following describes apparatus embodiments of this application in detail with reference to FIG. 8 to FIG. 11. It should be understood that the descriptions of the method embodiments correspond to descriptions of the apparatus embodiments. Therefore, for parts that are not described in detail, refer to the foregoing method embodiments.

Figure 8:
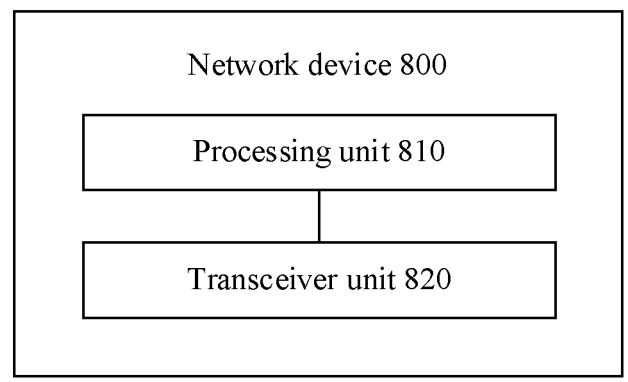
FIG. 8 is a schematic block diagram of a network device according to an embodiment of this application.

FIG. 8 is a schematic block diagram of a network device according to an embodiment of this application. The network device 800 includes a processing unit 810 and a transceiver unit 820.

The processing unit 810 is configured to determine a second moment based on a first moment and a first processing delay, where the first moment is an earliest moment that is estimated by the network device and at which a terminal device can send feedback information for first downlink data, and the first processing delay is a delay, estimated by the network device, in processing second downlink data by the terminal device. A time unit used by the second downlink data is after a time unit used by the first downlink data, and the second moment is after the first moment.

The transceiver unit 820 is configured to send indication information to the terminal device, where the indication information is used to indicate the terminal device to send feedback information for the second downlink data at the second moment or after the second moment.

In one embodiment, an interval between the first moment and the second moment is greater than or equal to the first processing delay.

In one embodiment, the time unit used by the second downlink data is a first time unit after the time unit used by the first downlink data.

In one embodiment, the first processing delay is determined based on at least one of the following parameters:

a moment corresponding to a last symbol in the time unit used by the second downlink data, a moment corresponding to a last symbol in a symbol that is in the time unit used by the second downlink data and that is used to carry a demodulation reference signal DMRS, duration required by the terminal device to process the second downlink data, or a length of the time unit used by the second downlink data, or a length of a slot corresponding to the second downlink data.

In one embodiment, the first processing delay is T, and T is obtained according to at least any one of the following formulas:

$T=T1-T2+T3;$ $T=T4;$ or $T=T5;$ wherein

T1 is the moment corresponding to the last symbol in the time unit used by the second downlink data;

T2 is the moment corresponding to the last symbol in the symbol that is in the time unit used by the second downlink data and that is used to carry the demodulation reference signal DMRS;

T3 is the duration required by the terminal device to process the second downlink data;

T4 is the length of the time unit used by the second downlink data; and

T5 is a length of a slot corresponding to the second downlink data.

In one embodiment, the transceiver unit 820 is further configured to: before the processing unit 810 determines the second moment based on the first moment and the first processing delay, receive capability information sent by the terminal device, and determine the first moment based on the capability information.

In one embodiment, the transceiver unit 820 is further configured to receive capability information sent by the terminal device, and determine, based on the capability information, the duration required by the terminal device to process the second downlink data.

It should be understood that the network device 800 shown in FIG. 8 may correspond to the network device in the communication method in the foregoing embodiments. Specifically, the network device 800 may correspond to the network device in the communication method in FIG. 6 or FIG. 7. In addition, the foregoing and other operations and/or functions of the units in the network device 800 are respectively used to implement corresponding procedures of the communication method in FIG. 6 or FIG. 7. For brevity, details are not described herein again.

Figure 9:
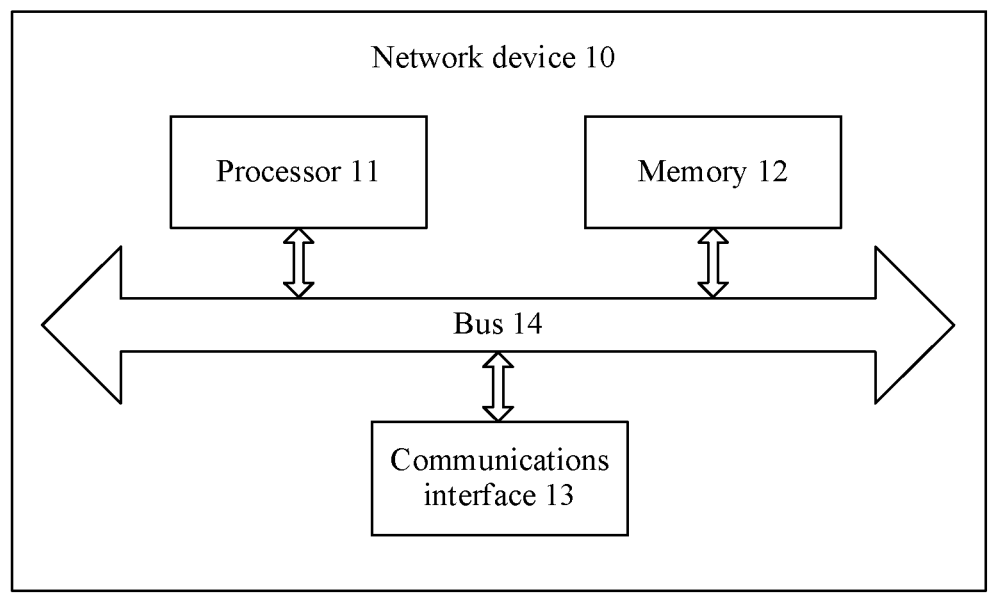
FIG. 9 is a schematic structural diagram of a network device according to an embodiment of this application.

FIG. 9 is a schematic structural diagram of a network device 10 according to an embodiment of this application. As shown in FIG. 9, the network device 10 includes a processor 11, a memory 12, a communications interface 13, and a bus 14. The processor 11, the memory 12, and the communications interface 13 (for example, a network adapter) communicate with each other through the bus 14, or may implement communication in another manner such as wireless transmission. The memory 12 is configured to store an instruction, and the processor 11 is configured to execute the instruction stored in the memory 12. The memory 12 stores program code, and the processor 11 may invoke the program code stored in the memory 12, to control the communications interface 13 to send and receive information or signals, so that the network device 10 performs the functions of and the actions or the processing processes performed by the network device in FIG. 1 to FIG. 7.

Specifically, the processor 11 may invoke the program code stored in the memory 12 to perform the following operations:

determining a second moment based on a first moment and a first processing delay, where the first moment is an earliest moment that is estimated by the network device and at which a terminal device can send feedback information for first downlink data, the first processing delay is a delay, estimated by the network device, in processing second downlink data by the terminal device, a time unit used by the second downlink data is after a time unit used by the first downlink data, and the second moment is after the first moment; and controlling the communications interface 13 to send indication information to the terminal device, where the indication information is used to indicate the terminal device to send feedback information for the second downlink data at the second moment or after the second moment.

It should be understood that the network device 10 may correspond to the network device described in the foregoing method embodiments, and modules or units in the network device 10 are respectively configured to perform the functions of and the actions or the processing processes performed by the network device in the foregoing method embodiments. Herein, to avoid repetition, detailed descriptions thereof are omitted.

Figure 10:
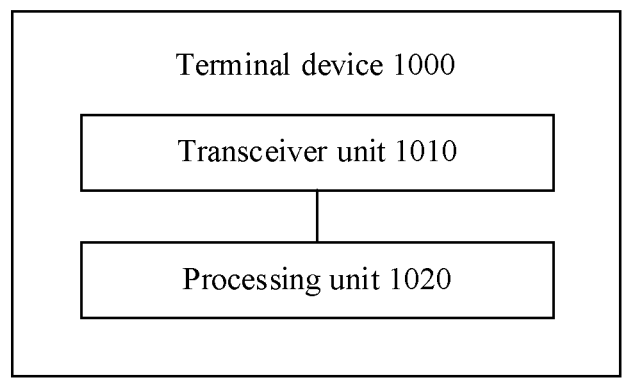
FIG. 10 is a schematic block diagram of a terminal device according to an embodiment of this application.

FIG. 10 is a schematic block diagram of a terminal device according to an embodiment of this application. The terminal device 1000 includes a transceiver unit 1010.

The transceiver unit 1010 is configured to receive indication information sent by a network device, where the indication information is used to indicate the terminal device to send feedback information for second downlink data after a second moment.

The second moment is determined based on a first moment and a first processing delay, where the first moment is an earliest moment that is estimated by the network device and at which the terminal device can send feedback information for first downlink data, the first processing delay is a delay, estimated by the network device, in processing the second downlink data by the terminal device, and the second moment is after the first moment.

A time unit used by the second downlink data is after a time unit used by the first downlink data.

The transceiver unit 1010 is further configured to send the feedback information for the second downlink data based on the indication information.

In one embodiment, the terminal device 1000 further includes a processing unit 1020, configured to determine an interval between the first moment and the second moment.

When the interval between the first moment and the second moment is greater than or equal to the first processing delay, the transceiver unit 1010 sends the feedback information for the second downlink data at the second moment or after the second moment based on the indication information.

In one embodiment, when the interval between the first moment and the second moment is less than the first processing delay, the processing unit 1020 determines that the feedback information for the first downlink data is not ACK information.

In one embodiment, an interval between the first moment and the second moment is greater than or equal to the first processing delay.

In one embodiment, the first processing delay is determined based on at least one of the following parameters:

a moment corresponding to a last symbol in the time unit used by the second downlink data, a moment corresponding to a last symbol in a symbol that is in the time unit used by the second downlink data and that is used to carry a demodulation reference signal DMRS, duration required by the terminal device to process the second downlink data, a length of the time unit used by the second downlink data, or a length of a slot corresponding to the second downlink data.

In one embodiment, the first processing delay is T, and T is obtained according to at least any one of the following formulas:

$$T = T1 - T2 + T3;$$

$$T = T4; \text{ or}$$

$$T = T5; \text{ where}$$

T1 is the moment corresponding to the last symbol in the time unit used by the second downlink data;

T2 is the moment corresponding to the last symbol in the symbol that is in the time unit used by the second downlink data and that is used to carry the demodulation reference signal DMRS;

T3 is the duration required by the terminal device to process the second downlink data;

T4 is the length of the time unit used by the second downlink data; and

T5 is the length of the slot corresponding to the second downlink data.

In one embodiment, the transceiver unit 1010 is specifically configured to:

before receiving the indication information sent by the network device, send capability information to the network device, where the first moment is determined based on the capability information.

In one embodiment, the transceiver unit 1010 is further configured to send capability information to the network device, where the duration required by the terminal device to process the second downlink data is determined based on the capability information.

It should be understood that the terminal device 1000 shown in FIG. 10 may correspond to the terminal device in the communication method in the foregoing embodiments. Specifically, the terminal device 1000 may correspond to the terminal device in the communication method in FIG. 6 or FIG. 7. In addition, the foregoing and other operations and/or functions of the units in the terminal device 1000 are respectively used to implement corresponding procedures of the communication method in FIG. 6 or FIG. 7. For brevity, details are not described herein again.

Figure 11:
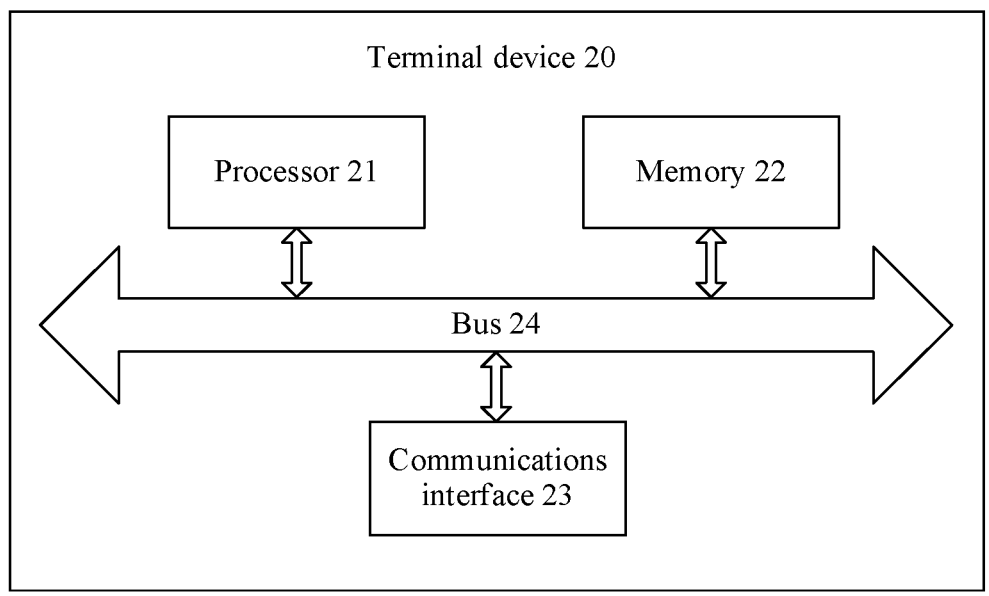
FIG. 11 is a schematic structural diagram of a terminal device according to an embodiment of this application.

FIG. 11 is a schematic structural diagram of a terminal device 20 according to an embodiment of this application. As shown in FIG. 11, the terminal device 20 includes a processor 21, a memory 22, a communications interface 23, and a bus 24. The processor 21, the memory 22, and the communications interface 23 may communicate with each other through the bus 24, or may implement communication in another manner such as wireless transmission. The memory 22 is configured to store an instruction, and the processor 21 is configured to execute the instruction stored in the memory 22. The memory 22 stores program code, and the processor 21 may invoke the program code stored in the memory 22, to control the communications interface 23 to send and receive information or signals, so that the terminal device 20 performs the functions of and the actions or the processing processes performed by the processing unit in the terminal device in the foregoing method embodiments.

It should be understood that the terminal device 20 may correspond to the terminal device described in the foregoing method embodiments, and modules or units in the terminal device 20 are respectively configured to perform the functions of and the actions or the processing processes performed by the processing unit in the terminal device in the foregoing method embodiments. Herein, to avoid repetition, detailed descriptions thereof are omitted.

In the embodiments of this application, the processor may be a CPU, or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, any conventional processor, or the like.

It should be noted that the embodiments of this application may be applied to the processor of the acceleration card, or may be implemented by the processor of the acceleration card. The processor may be an integrated circuit chip and has a signal processing capability. In an implementation process, operations in the foregoing method embodiments can be implemented by a hardware integrated logic circuit in the processor or instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the operations, and logical block diagrams that are disclosed in the embodiments of this application. The general purpose processor may be a microprocessor, any conventional processor, or the like. Operations of the methods disclosed with reference to the embodiments of this application may be directly executed and completed by a hardware decoding processor or a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It should be understood that the memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be further understood that, the bus may further include a power bus, a control bus, a status signal bus, and the like, in addition to a data bus. However, for clear description, various types of buses in the figure are marked as the bus.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division to the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in the form of a software product. The computer software product is stored in a storage medium, and includes instructions for instructing a computer device (which may be a personal computer, a server, a network device, or the like) to perform all or some of the operations of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method by a network device, the method comprising:
   determining, by the network device, a second moment based on a first moment and a first processing delay, wherein the first moment is an estimated earliest moment at which a terminal device in wireless communications with the network device can send feedback information for first downlink data to the network device, wherein the first processing delay is an estimated delay in processing second downlink data by the terminal device, wherein a time unit used by the second downlink data is after a time unit used by the first downlink data, and wherein the second moment is after the first moment; and
   transmitting indication information, including the determined second moment, to the terminal device to indicate to the terminal device to send feedback information for the second downlink data at or after the second moment.

2. The communication method according to claim 1, wherein an interval between the first moment and the second moment is greater than or equal to the first processing delay.

3. The communication method according to claim 1, wherein the first processing delay is determined based on at least one of the following parameters:
   a moment corresponding to a last symbol in the time unit used by the second downlink data, a moment corresponding to a last symbol in a symbol that is in the time unit used by the second downlink data and that is to carry a demodulation reference signal (DMRS), a duration required by the terminal device to process the second downlink data, a length of the time unit used by the second downlink data, or a length of a slot corresponding to the second downlink data.

4. The communication method according to claim 3, wherein the first processing delay is T, and T is obtained according to at least any one of the following formulas:

$T=T1-T2+T3;$ $T=T4;$ or $T=T5;$ wherein

T1 is the moment corresponding to the last symbol in the time unit used by the second downlink data;
T2 is the moment corresponding to the last symbol in the symbol that is in the time unit used by the second downlink data and that is to carry the DMRS;
T3 is the duration required by the terminal device to process the second downlink data;
T4 is the length of the time unit used by the second downlink data; and
T5 is the length of the slot corresponding to the second downlink data.

5. The communication method according to claim 1, wherein before the determining a second moment based on a first moment and a first processing delay, the communication method further comprises:
   receiving capability information sent by the terminal device, and determining the first moment based on the capability information.

6. The communication method according to claim 3, wherein the communication method further comprises:
   receiving capability information sent by the terminal device, and determining, based on the capability information, the duration required by the terminal device to process the second downlink data.

7. A communication method by a terminal device in wireless communications with a network device, the method comprising:
   receiving indication information from the network device, wherein the indication information comprises indication to the terminal device to send feedback information for second downlink data at or after a second moment; wherein the second moment is determined based on a first moment associated with first downlink data and a first processing delay, wherein the first moment is an estimated earliest moment at which a terminal device can send feedback information for the first downlink data, wherein the first processing delay is an estimated delay in processing the second downlink data by the terminal device, and wherein the second moment is after the first moment; and wherein the second downlink data uses a time unit that is after a time unit used by the first downlink data; and
   sending the feedback information for the second downlink data based on the indication information.

8. The communication method according to claim 7, wherein
   the sending the feedback information for the second downlink data based on the indication information comprises:
   when an interval between the first moment and the second moment is greater than or equal to the first processing delay, sending the feedback information for the second downlink data at the second moment or after the second moment based on the indication information; or
   when an interval between the first moment and the second moment is less than the first processing delay, determining that the feedback information for the first downlink data is not ACK information.

9. The communication method according to claim 7, wherein an interval between the first moment and the second moment is greater than or equal to the first processing delay.

10. The communication method according to claim 7, wherein the first processing delay is determined based on at least one of the following parameters:
    a moment corresponding to a last symbol in the time unit used by the second downlink data, a moment corresponding to a last symbol in a symbol that is in the time unit used by the second downlink data and that is to carry a demodulation reference signal (DMRS), a duration required by the terminal device to process the second downlink data, a length of the time unit used by the second downlink data, or a length of a slot corresponding to the second downlink data.

11. The communication method according to claim 10, wherein the first processing delay is T, and T is obtained according to at least any one of the following formulas:

$T=T1-T2+T3;$ $T=T4;$ or $T=T5;$ wherein

T1 is the moment corresponding to the last symbol in the time unit used by the second downlink data;

T2 is the moment corresponding to the last symbol in the symbol that is in the time unit used by the second downlink data and that is used to carry the DMRS;

T3 is the duration required by the terminal device to process the second downlink data;

T4 is the length of the time unit used by the second downlink data; and

T5 is the length of the slot corresponding to the second downlink data.

12. The communication method according to claim 7, wherein before the receiving indication information sent by a network device, the communication method further comprises:

sending capability information to the network device, wherein the first moment is determined based on the capability information.

13. The communication method according to claim 10, wherein the communication method further comprises:

sending capability information to the network device, wherein the duration required by the terminal device to process the second downlink data is determined based on the capability information.

14. A communications apparatus operating as a terminal device, comprising:

a transceiver unit, configured to receive indication information sent by a network device, wherein the indication information comprises indication to the communication apparatus to send feedback information for second downlink data at or after a second moment; wherein the second moment is determined based on a first moment associated with first downlink data received at the communication apparatus and a first processing delay, wherein the first moment is an estimated earliest moment at which the communication apparatus can send feedback information for the first downlink data, wherein the first processing delay is an estimated delay in processing the second downlink data by the terminal device, and wherein the second moment is after the first moment;

wherein a time unit used by the second downlink data is after a time unit used by the first downlink data; and wherein the transceiver unit is further configured to send the feedback information for the second downlink data based on the indication information.

15. The communications apparatus according to claim 14, wherein the communications apparatus further comprises a processing unit; wherein the processing unit is configured to determine an interval between the first moment and the second moment; and when the interval between the first moment and the second moment is greater than or equal to the first processing delay, the transceiver unit sends the feedback information for the second downlink data at the second moment or after the second moment based on the indication information; or when the interval between the first moment and the second moment is less than the first processing delay, the processing unit determines that the feedback information for the first downlink data is not ACK information.

16. The communications apparatus according to claim 14, wherein an interval between the first moment and the second moment is greater than or equal to the first processing delay.

17. The communications apparatus according to claim 14, wherein the first processing delay is determined based on at least one of the following parameters:

a moment corresponding to a last symbol in the time unit used by the second downlink data, a moment corresponding to a last symbol in a symbol that is in the time unit used by the second downlink data and that is used to carry a demodulation reference signal (DMRS), a duration required by the terminal device to process the second downlink data, a length of the time unit used by the second downlink data, or a length of a slot corresponding to the second downlink data.

18. The communications apparatus according to claim 17, wherein the first processing delay is T, and T is obtained according to at least any one of the following formulas:

$T=T1-T2+T3;$ $T=T4;$ or $T=T5;$ wherein

T1 is the moment corresponding to the last symbol in the time unit used by the second downlink data;

T2 is the moment corresponding to the last symbol in the symbol that is in the time unit used by the second downlink data and that is used to carry the DMRS;

T3 is the duration required by the terminal device to process the second downlink data;

T4 is the length of the time unit used by the second downlink data; and

T5 is the length of the slot corresponding to the second downlink data.

19. The communications apparatus according to claim 14, wherein the transceiver unit is specifically configured to:

before receiving the indication information sent by the network device, send capability information to the network device, wherein the first moment is determined based on the capability information.

20. The communications apparatus according to claim 17, wherein the transceiver unit is further configured to:

send capability information to the network device, wherein the duration required by the terminal device to process the second downlink data is determined based on the capability information.

* * * * *